US010922540B2

(12) United States Patent
Stanley et al.

(10) Patent No.: US 10,922,540 B2
(45) Date of Patent: Feb. 16, 2021

(54) CLUSTERING, CLASSIFYING, AND SEARCHING DOCUMENTS USING SPECTRAL COMPUTER VISION AND NEURAL NETWORKS

(71) Applicant: Neural Vision Technologies LLC, Houston, TX (US)

(72) Inventors: Brent G. Stanley, Houston, TX (US); Joseph Vance Haynes, Leesburg, VA (US)

(*) Notice: Subject to any disclaimer, the term of this patent is extended or adjusted under 35 U.S.C. 154(b) by 55 days.

(21) Appl. No.: 16/425,544

(22) Filed: May 29, 2019

(65) Prior Publication Data

US 2020/0012851 A1    Jan. 9, 2020

Related U.S. Application Data

(60) Provisional application No. 62/693,804, filed on Jul. 3, 2018.

(51) Int. Cl.

| | |
|---|---|
| *G06K 9/00* | (2006.01) |
| *G06K 9/46* | (2006.01) |
| *G06K 9/62* | (2006.01) |
| *G06K 9/64* | (2006.01) |
| *G06N 3/08* | (2006.01) |
| *G06N 3/04* | (2006.01) |
| *G06F 16/93* | (2019.01) |

(52) U.S. Cl.
CPC ......... *G06K 9/00483* (2013.01); *G06F 16/93* (2019.01); *G06K 9/4647* (2013.01); *G06K 9/6232* (2013.01); *G06K 9/64* (2013.01); *G06N 3/04* (2013.01); *G06N 3/08* (2013.01); *G06K 9/6224* (2013.01); *G06K 9/6267* (2013.01)

(58) Field of Classification Search
None
See application file for complete search history.

(56) References Cited

U.S. PATENT DOCUMENTS

2015/0131870 A1*  5/2015  Hudson ................. G06F 3/0483
                                                                  382/112

* cited by examiner

*Primary Examiner* — Soo Jin Park

(57) ABSTRACT

Systems and associated methods relate to classification of documents according to their spectral frequency signatures using a deep neural network (DNN) and other forms of spectral analysis. In an illustrative example, a DNN may be trained using a set of predetermined patterns. A trained DNN may, during runtime, receive documents as inputs, where each document has been converted into a spectral format according to a (2D) Fourier transform. Some exemplary methods may extract periodicity/frequency information from the documents based on the spectral signature of each document. A clustering algorithm may be used in clustering/ classification of documents, as well as searching for documents similar to a target document(s). A variety of implementations may save significant time to users in organizing, searching, and identifying documents in the areas of mergers and acquisitions, litigation, e-discovery, due diligence, governance, and investigatory activities, for example.

20 Claims, 23 Drawing Sheets

CLUSTERING, CLASSIFYING, AND SEARCHING DOCUMENTS USING SPECTRAL COMPUTER VISION AND NEURAL NETWORKS

This application also claims the benefit of U.S. Provisional Application Ser. No. 62/693,804, titled "Recognizing and Classifying Document Images Using Computer Vision and Neural Networks," filed by Brent G. Stanley and Joseph V, Haynes, on Jul. 3, 2018.

This application incorporates the entire contents of the foregoing application(s) herein by reference.

TECHNICAL FIELD

Various embodiments relate generally to document classification and searching using machine learning techniques and artificial intelligence.

BACKGROUND

Documents are used by virtually every business and government entity to record information and communicate ideas between human beings. Documents may come in many different varieties, such as legal, accounting, invoices, academic, user manuals, and scripts, for example. A page layout may be a part of graphic design that deals in the arrangement of visual elements on a document. Some documents may be paper documents, while other documents may be paperless (e.g., electronically-stored) documents. Many business activities require the gathering, analysis and turnover of batches of document-based data. Such activities include mergers and acquisitions, litigation and e-discovery, and other security, due diligence, governance and investigatory activities.

Discovery (in the legal context) refers to pre-trial procedures performed during litigation for the purpose of uncovering facts that may be relevant to legal questions in a given case. Discovery may include elements such as answers to interrogatories, requests for production of documents, request for admissions, and depositions. Electronic discovery refers to a type of discovery where information (such as documents) are kept in an electronic format (sometimes referred to as electronically stored information or ESI). In some jurisdictions, there may be a duty for a specific party to preserve ESI. In such situations, if a party negligently, knowingly, or intentionally destroys ESI (e.g., by erasing a hard drive), the party may have committed spoliation of evidence and may be subject to court sanctions and/or criminal prosecution.

SUMMARY

Systems and associated methods relate to classification of documents according to their spectral periodicity signatures using a deep neural network (DNN) and other forms of spectral analysis. In an illustrative example, a DNN may be trained using a set of predetermined patterns. A trained DNN may receive documents as inputs, where each document has been converted into a spectral format using a Fourier transform. Some methods may extract periodicity/frequency information from the documents based on the spectral signature of each document. A clustering algorithm may reorganize an unknown collection of documents into individual groups which are visually similar. A searching algorithm may be used to search for documents similar to target document(s). A variety of implementations may save significant time to users in organizing, searching, and identifying documents in the areas of mergers and acquisitions, litigation, e-discovery, due diligence, information governance, privacy, security and investigatory activities, for example.

Various embodiments may achieve one or more advantages. For example, some embodiments may utilize pre-trained DNN that does not rely on slow and cumbersome just-in-time learning for operation. A pre-trained DNN may allow for users of the system to get clustering and/or search results in near real-time. Various implementations may classify documents according to their unique spectra, which may advantageously provide for high-accuracy clustering and searching functions. Some examples may perform various scaling, processing, and transformations to documents to convert them into a common format for use by the DNN, which may allow the system to reliably classify documents having a wide variety of formats. Various spectral features may be extracted from the spectral signatures of documents that identify key defining characteristics for use as vector element inputs for clustering and searching. These spectral features may increase the accuracy and reliability of the system by extracting unique spectral attributes that are very effective for use in clustering and searching. Various embodiments of the DNN may exhibit emergent properties, especially for large datasets, where the fully-trained DNN as a whole has properties its parts do not have (e.g., where "the whole is greater than the sum of the parts"). Some aspects may improve the functioning of computer operations by increasing the accuracy, speed, reliability, and efficiency of document clustering and search. Some implementations may cluster/search documents based on visual appearance as opposed to specific content/text, which may advantageously be text agnostic (e.g., be able to work with a wide variety of document types). Various embodiments may also be immune from misspellings, optical character recognition (OCR) mangling, and even different languages, so long as the visual appearance of the document is maintained.

Various examples of methods and systems may employ a three-phase process using computer vision to create a spectral signature of each document and then compare the spectral signatures of each document to each other using neural networks. Statistical analysis may be used match similar spectral signatures to each other and self-organize (e.g., "cluster") the signatures into groups. These groups may represent documents which share common visual properties (including the presence of color, for example) and are therefore the same document type. Various exemplary processes may not require user-originated training and may not require reliance on raw text. Simplicity and elegance of use may be a defining characteristic of various systems and methods disclosed herein. Some implementations may employ a self-organizing map (SOM) or a Kohonen network for cluster analysis. Some examples may build a DNN for (later) use during "training/design time," and employ the DNN for spectral clustering/searching functions in "run time."

In various implementations, at least two modes of operation may be available to the user. A first mode of operation may be automatic clustering of a large collection of documents in the absence of specific metadata describing their document type. Unclassified, untagged, and disorganized batches of documents of common file types (e.g., PDF, DOC, TIFF) may be processed, and upon processing completion, a user may receive the same documents back, organized into classes/folders with each class/folder containing a single type of visually and structurally similar document. Users may create or import a multi-level taxonomy ("tagging tree") directly into a user interface, for example. A user may perform the action of "clicking and dragging" an automatically generated cluster folder of visually similar documents to the tagging tree. The accuracy of results using various disclosed systems and processes may generally be about 99.5% or better. Variants of a single document type can receive the same tag, and all tags documents may be persisted to documents processed in the future which share the same visual features. Tuning can be performed to adjust the fidelity and/or screen for particular features of interest, such as signature blocks. In various examples, users may export files and/or their new metadata back to themselves, embedding the applied tags in the file name and/or a spreadsheet/csv file containing the original file path and file name.

A second mode of operation may be a search mode where a user's objective is finding pages of documents which have a similar visual structure to a sample/target document held by the user. In this second mode, the sample/target document may be provided to the system and the system may return similar document results ("more like this") based on visual similarity. Expected results may be all pages of documents processed which possess visual similarity of structure, while containing different specific content. In this sense, the second mode of operation may, in effect, perform a "bloodhound search" to search for and track down documents that are visually similar (in the spectral domain) to a single (or a plurality of) target document(s).

Various embodiments may relate to a method for recognizing and classifying visually similar documents of multiple file types using a three-phase process. Phase 1 may prepare an image for each document and perform pre-filtering spatial analysis. Phase 2 may be performed in the spectral domain and may include another pre-filtering step, followed by applying a two-dimensional Fourier Transform to the image. Initial classification may be performed based on cross-probability analysis using a custom neural network and Euclidian analysis of the spectra. Recursive analysis may continue until no additional classifications are pruned or created. Archetype documents may be created, and re-classification may be performed on documents purged in the previous step. Similar classes of classified documents may be merged. Phase 3 may include grouping the original documents in the classifications created from the previous steps and creating virtual file folders of documents for each classification, and preparing a manifest of the processed files and their classification results. Results may be used to either (1) profile and classify documents by their type based on visual similarity, or (2) search for specific document types using exemplar inputs to the process. Users may apply metadata directly to the results, and export that metadata for those specific files and persist the tagging intelligence go-forward on future data sets where new documents will inherit relevant tags based on past decisions.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1A:
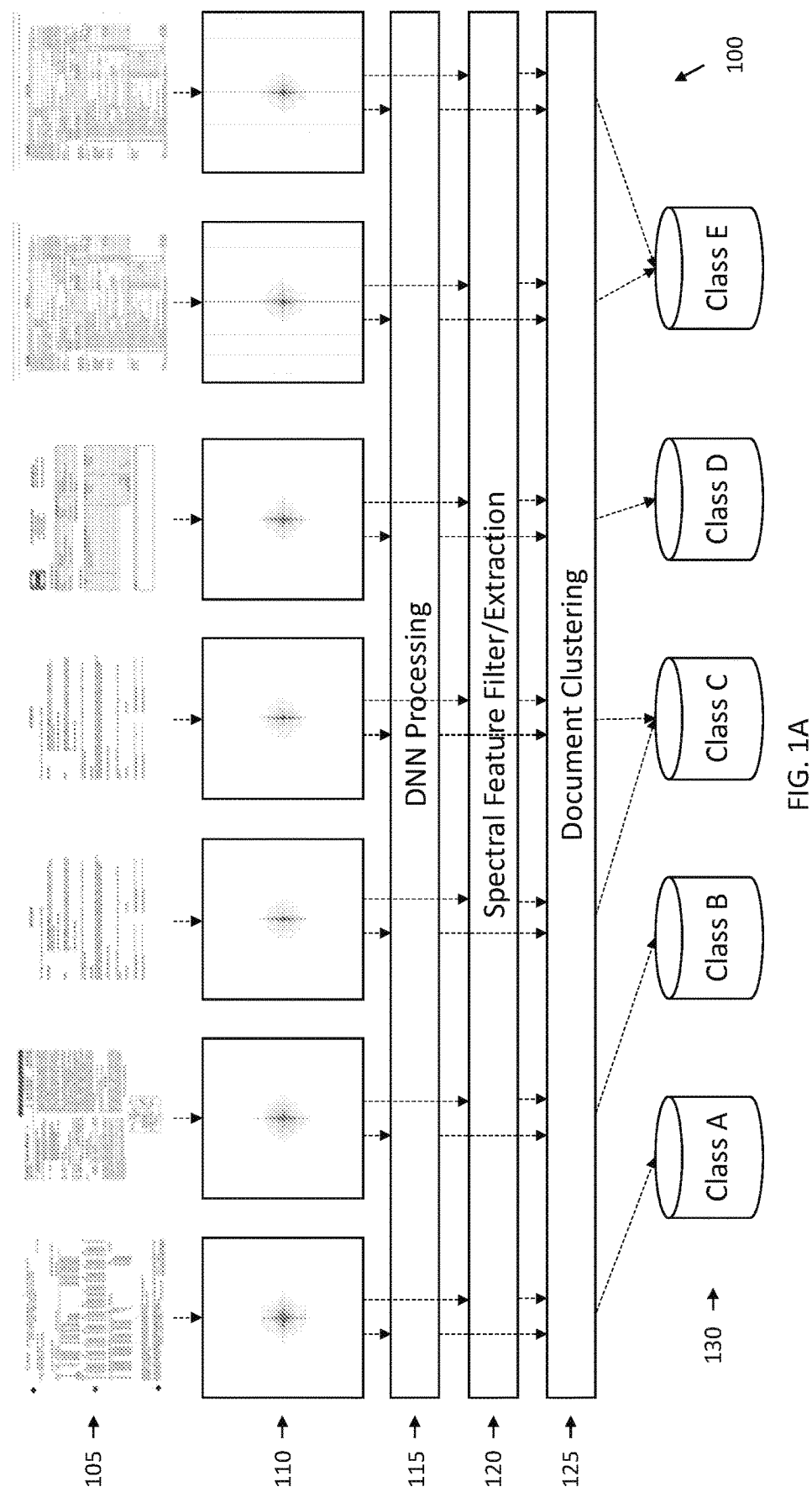
FIG. 1A depicts a diagrammatic view of an exemplary computer vision processing flow for clustering and/or classifying electronic documents according to document spectral analysis using a deep neural network (DNN).

FIG. 1A depicts a diagrammatic view of an exemplary computer vision processing flow for clustering and/or classifying electronic documents according to document spectral analysis using a deep neural network (DNN). A clustering/classification process flow 100 includes a step of collecting at least one electronic document 105. Each document 105 is then transformed into its spectral signature 110 using a (2D) Fourier transform. Next, the spectral signatures 110 of each document are processed through a (pretrained) deep neural network (DNN) at step 115. In various implementations, the DNN may be an (adversarial) DNN that may utilize a Softmax function in a layer of the DNN, for example. As a result of the processing through the DNN at step 115, a correlation spectrum vector is generated that can be utilized as an input in step 125. Next, the spectral signature 110 of each document 105 is run through a spectral feature filter/extraction process at step 120, which may filter various parameters of the spectral signature 110 and/or extract unique spectral features from the spectral signature 110. As a result of the spectral feature filtering/extraction, at least one spectral feature vector is generated that can be utilized as an input in step 125. In various examples, steps 115 and 120 may be separate processes (potentially done in parallel), each with different outputs that feed into 125 as input criteria for classification. The generated vector(s) outputs associated with each document 105 (from steps 115 and 120) are used as inputs in a document clustering process at step 125, which may utilize the vectors as (intermediate) data for a clustering algorithm. Specifically, the output vectors from steps 115 and 120 may be cross-correlated into at least one product-moment matrix, where each entry in the at least one matrix represents a correlation moment for a particular document. The entries in the at least one matrix may then be used as inputs in a clustering algorithm. In various implementations, the clustering algorithm may include a self-organizing map (Kohonen network) or K-means clustering algorithm, for example. As a result of the document clustering 125, each document 105 may be classified into one of a set of classes 130 (A-E in the depicted example). Classification (in contrast with clustering) may involve using the results of clustering, and based on those results, assigning a metadata value to each document, so that all documents have a metadata classification associated with them. For example, in classification, a system may already "know" that it is looking for, since documents have been assigned/grouped using metadata to label which documents are in which classes, whereas in clustering, the system may "not yet know" what to look for.

In the example shown in FIG. 1A, seven documents are shown. Going from left to right, one document is a first invoice, one document is an issued U.S. patent, two documents are affidavits, one document is a second (different) invoice, and two documents are IRS tax returns. After going through the steps 110-125, the documents 105 are classified according to their visual similarity and unique spectral characteristics. In this example, the first invoice is classified into class A, the patent is classified into class B, both affidavits are classified into class C, the second invoice is classified into class D, and both IRS tax returns are classified into class E. In this sense, the clustering/classifying process 100 may advantageously allow a user with a vast quantity of documents (e.g., on the order of a million documents or more) to quickly process and categorize each document according to is visual appearance and spectral similarity to other documents (in contrast to content or textual similarity), thus saving the user significant time and energy in organizing their vast collection of previously unclassified and unorganized documents.

Figure 1B:
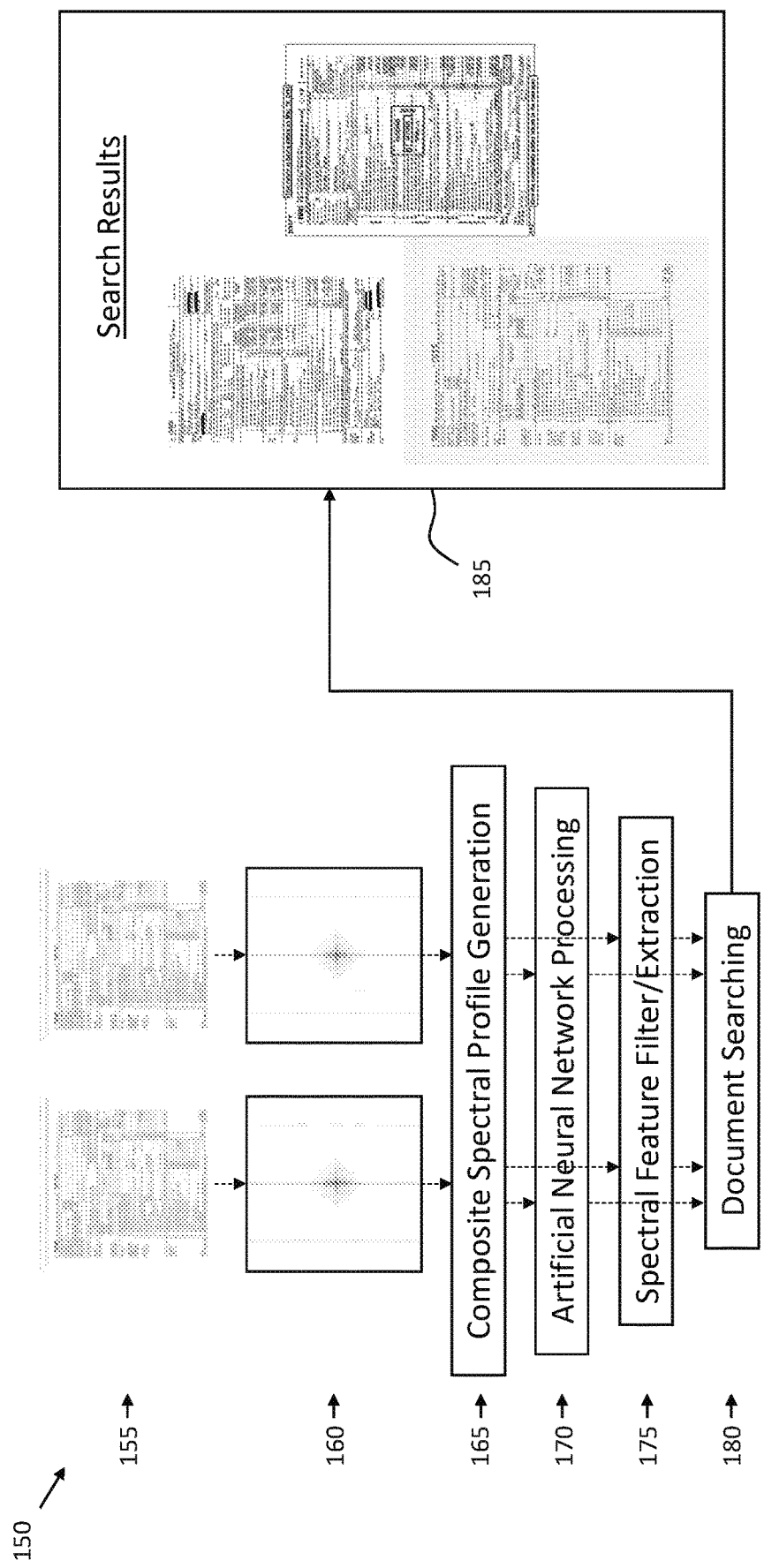
FIG. 1B depicts a diagrammatic view of an exemplary computer vision processing flow for searching electronic documents to find spectrally similar documents using a deep neural network (DNN).

FIG. 1B depicts a diagrammatic view of an exemplary computer vision processing flow for searching electronic documents to find spectrally similar documents using a deep neural network (DNN). In a search application illustrated in FIG. 1B, the DNN may be used as a component for a "search engine" for finding documents that are visually similar to at least one target document. A search process flow 150 begins with collecting at least one target document 155 for use as a "search query" in a search to find documents that are visually similar to the at least one target document 155. In this exemplary illustration, two target documents are shown, although more than two documents or just a single document may be used. Next, the target document(s) 155 are then transformed into their spectral signatures 160 using a (2D) Fourier transform. Next, at step 165 a composite spectral profile is generated that is a composite (e.g., a weighted average) of the spectral signatures 160 associated with each target document 155. In some examples, the composite spectral profile may be a multi-dimensional centroid, where each dimension value is a weighted average. Step 165, in some examples, may be an optional step that is only performed when there is more than one document included in the target document(s) 155. Next, the (composite) spectral profile is processed through a (pretrained) deep neural network (DNN) at step 170, which may be the same DNN described with respect to FIG. 1A, step 115, for example. As a result of the processing through the DNN, a correlation spectrum vector is generated that can be utilized as an input in step 180. Next, the (composite) spectral profile is run through a spectral feature filter/extraction process 175, which filters various parameters of the (composite) spectral profile and/or extracts unique spectral features from the (composite) spectral profile to generate at least one spectral feature vector. In some examples, for searching (FIG. 1B), the ANN processing and spectral feature filter/extraction steps 170, 175 may be substantially similar to the corresponding steps 115, 120 for classification (FIG. 1A). ] Next, the generated vector(s) from steps 170 and 175 are used as inputs in a document searching process at step 180. Specifically, the output vectors from steps 170 and 175 may be cross-correlated into at least one product-moment matrix, where each entry in the at least one matrix represents a correlation moment for a particular document. The entries in the at least one matrix may then be used as inputs in a searching algorithm. A searching process 180 may, in some embodiments, be simpler than step 125 from FIG. 1A, because in the searching process, the system may already know the boundary around the centroid of the documents being searched for. As a result of the document searching, a collection of documents is returned as search results 185 that the process 150 has determined to be visually and spectrally similar to the target document(s) 155.

In the example shown in FIG. 1B, two search query documents and three search result documents are shown. The two documents are IRS tax returns, which at step 165, are combined together to form a (spectral) composite image for use in the search process 150. The output of the search process 150 is a set of three different IRS tax returns that are visually and spectrally similar to the two target IRS tax return documents used as the initial search query. The search process 150 may advantageously allow for easy and quick discovery of similar documents in a vast quantity of documents based on visual and spectral characteristics (as opposed to content or textual characteristics). In this sense, a system employing the steps of process 150 may be able to locate a "needle in a haystack" using spectral computer vision powered by machine learning algorithms, therefore saving a user significant time and energy in searching through their vast collection of unorganized documents.

Figure 2:
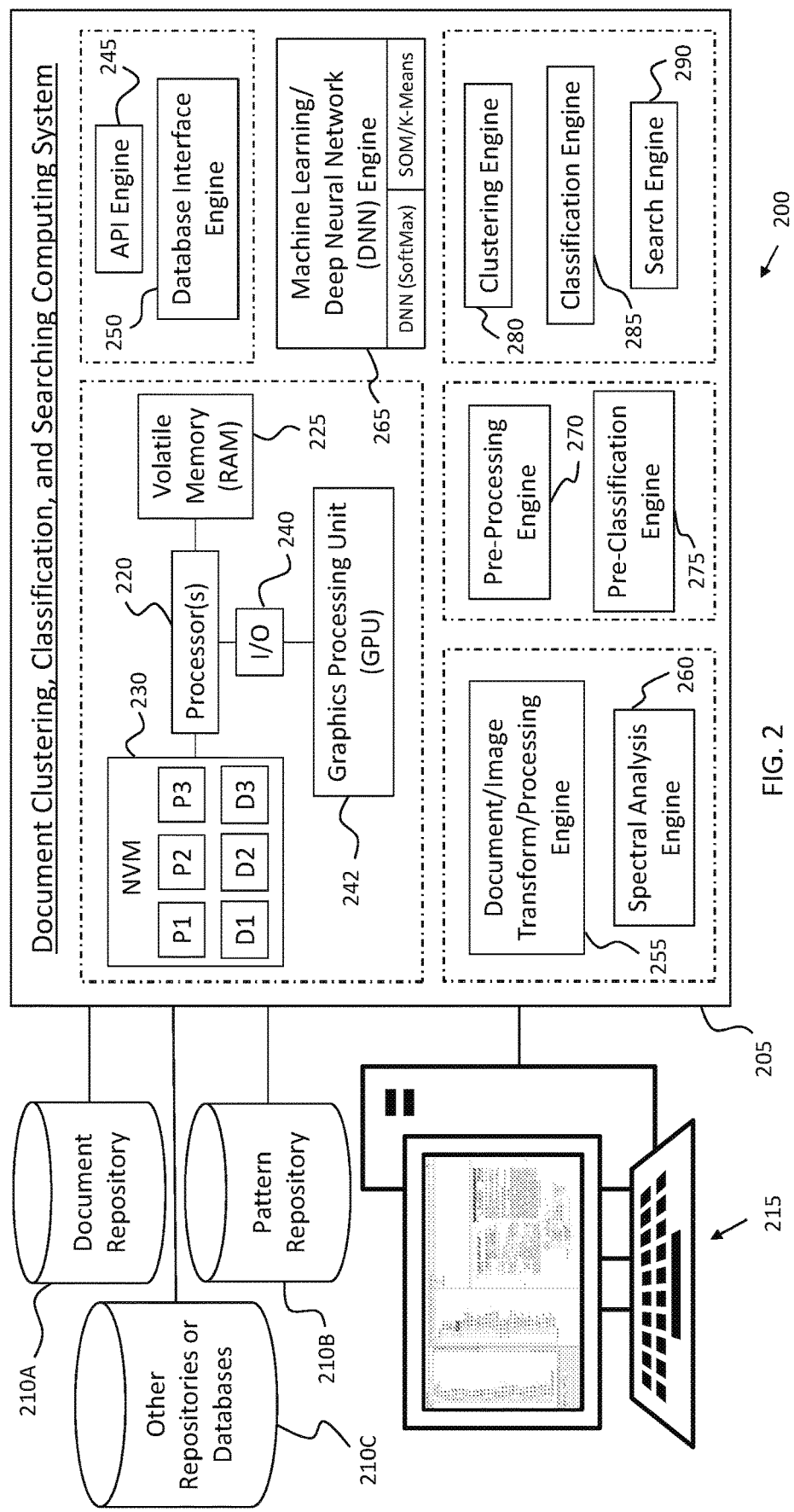
FIG. 2 depicts a diagrammatic view of an exemplary electronic document clustering, classification, and searching computing system.

FIG. 2 depicts a diagrammatic view of an exemplary electronic document clustering, classification, and searching computing system. A system 200 includes an electronic document clustering, classification, and searching computing system 205. The computing system 205 is operably coupled to a document repository 210A and a pattern repository 210B. In some examples, the computing system 205 may be operably coupled to other databases and/or repositories 210C. The computing system 205 is operably coupled to a user computer 215, which may include a user interface. A user may interact with the user computer 215 to perform various operations and functions associated with the computing system 205. The computing system 205 may use the pattern repository 210B to train a DNN, which may be used to cluster/classify documents and/or search for similar documents, for example.

The computing system 205 includes one or more processors 220, volatile memory (e.g., RAM) 225, non-volatile memory (NVM) 230, and input/output (I/O) 240. Stored in NVM 230 are various programs P1, P2, P3, along with data and/or data structures D1, D2, D3. The at least one processor 220 may execute instructions in accordance with the programs P1-P3 that utilize the data D1-D3 to accomplish the various functions and objectives of the computing system 205. The I/O 240 may transmit and/or receive data from other devices (such as the user computer 215 and/or repositories 210A, 210B, 210C, for example), over a network (such as the Internet, for example). In various examples, the repositories 210A, 210B, and/or 210C may be included in the NVM 230. The computing system 205 includes a graphics processing unit (GPU) operatively coupled (e.g., via I/O 240) to the CPU 220. The CPU may offload specific processing tasks to the GPU, which may be specially designed to handle massive parallel (vector) processing of data. For example, calculations for machine learning algorithms (such as for DNN and clustering algorithms) may be performed by the GPU at the instruction of the CPU. The GPU in some embodiments may be a field-programmable gate array (FPGA) that is designed and optimized to perform various operations disclosed herein (such as implementing deep neural network processing or other vector operations).

The computing system 205 includes various engines that power the various functions of the computing system 205. Each engine may, in some examples, be embodied as program code (e.g., P1-P3) and/or data (e.g., D1-D3) stored in the NVM. It may be understood that some of the engines shown in the system 205 may overlap in function, may be integrated with one another, or may be one and the same engine in the system 205. For example, the engine 255 may perform at least some operations that are also performed by the engines 265 and/or 275.

An application programming interface (API) engine 245 may enable the computing system 205 to interface with other devices and/or applications that are external to the computing system 205. A database interface engine 250 may enable the computing system 205 to interface with databases such as the database 210C, for example. A document/image transformation/processing engine 255 may perform various processing and/or transformation operations on documents and/or images. For example, the engine 255 may transform documents (e.g., in DOC, PDF, PPT file format) into images (e.g., bitmap file formats), and/or may perform Gaussian filtering operations on a document or image. The engine 255 may, for example, perform various scaling and (affine) transformation operations on a document or image. In some embodiments, the engine 255 may extract various spectral features from a spectral signature of a document. A spectral analysis engine 260 may perform various spectral operations and/or transformations on documents and/or images. For example, the spectral analysis engine 260 may perform a two-dimensional Fourier Transform on a document image to convert the image to its corresponding spectral domain.

A machine learning/deep neural network (DNN) engine 265 may perform various machine learning operations such as training/generating a DNN using a set of training data. In some implementations, a machine learning engine 265 may train/use a DNN, which may be a DNN that utilizes a softmax function for generating a correlation vector. In some examples, the machine learning engine 265 may use a K-means clustering algorithm to cluster/classify certain documents with centroids. In various embodiments, the machine learning engine 265 may use a self-organizing map (SOM), such as (or similar to) a Kohonen network, to use competitive learning in classifying/clustering documents. A pre-processing engine 270 may perform various pre-processing operations, such as making an initial determination as to whether a document is classifiable or unclassifiable. A pre-classification engine 275 may perform various pre-classification operations, such as converting a document to an image (e.g., bitmap) representation, and/or conversion of an image to a symmetric (e.g., L×L) format.

The system 205 includes a clustering engine 280, which may form clusters of documents based on vectors and/or correlation matrices that are functions of the spectral attributes of documents. For example, the clustering engine 280 may employ a K-means clustering algorithm to generate centroids that define clusters of visually and spectrally similar documents. The system 205 includes a classification engine 285. The classification engine 285 may generate a classification scheme to classify documents into groups based on visual/spectral similarity. The classification engine 285 may cooperate with the clustering engine 280 and/or the machine learning engine 265 to perform classification operations. The system 205 includes a search engine 290. The search engine 290 may perform operations such as finding other documents that are visually similar to a target document or target documents, for example. In this respect, the search engine 290 may perform a "bloodhound" search to "find documents like this (target) document." The search engine 290 may leverage a learned DNN generated by the machine learning engine 265 to aid in various searching functions. The search engine 290 may cooperate with the clustering engine 280, classification engine 285, and/or the machine learning engine 265 to perform search operations.

Figure 3A:
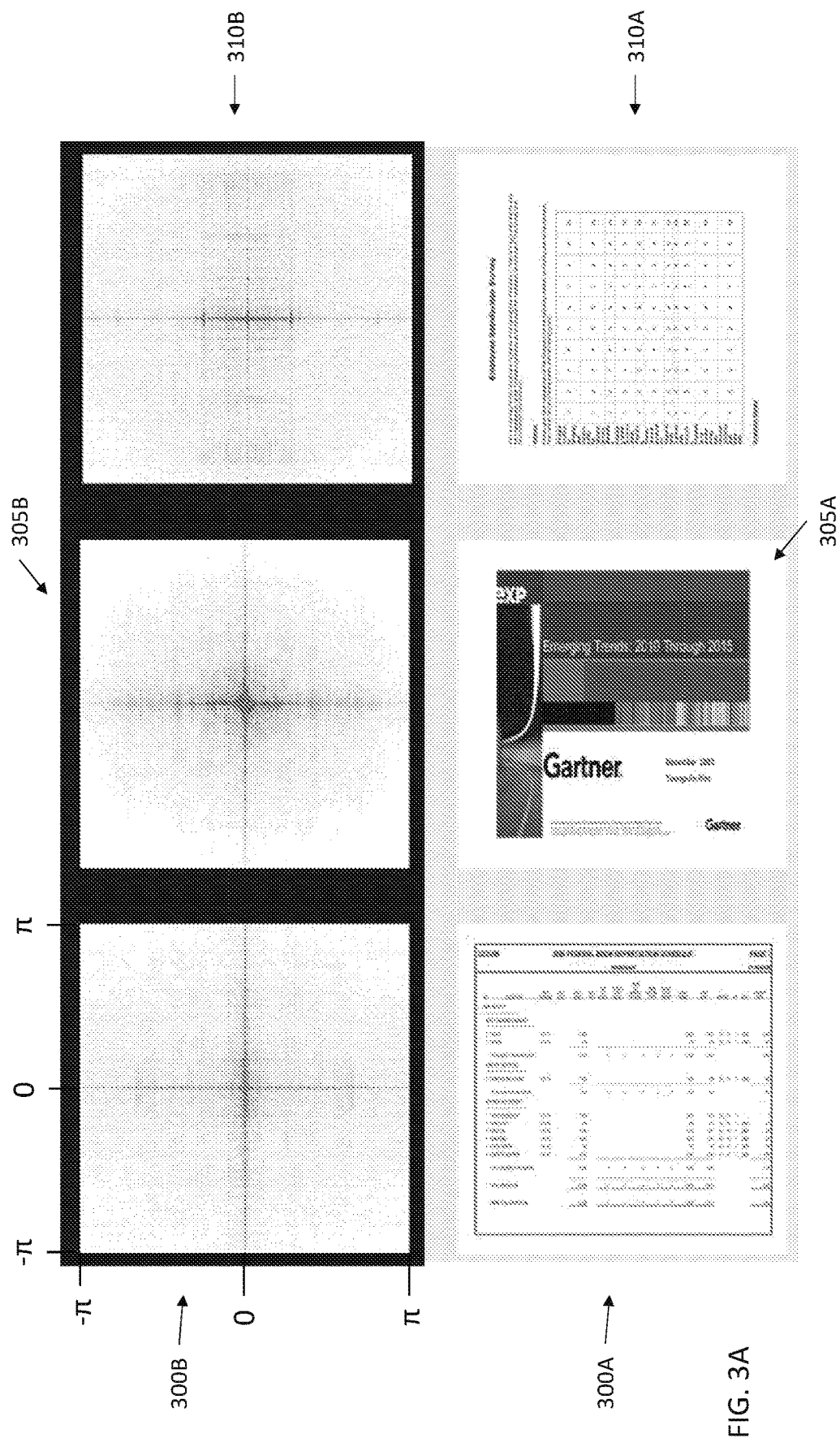
FIGS. 3A and 3B depict plan views of exemplary electronic documents along with Fourier transforms of each electronic document.
Figure 3B:
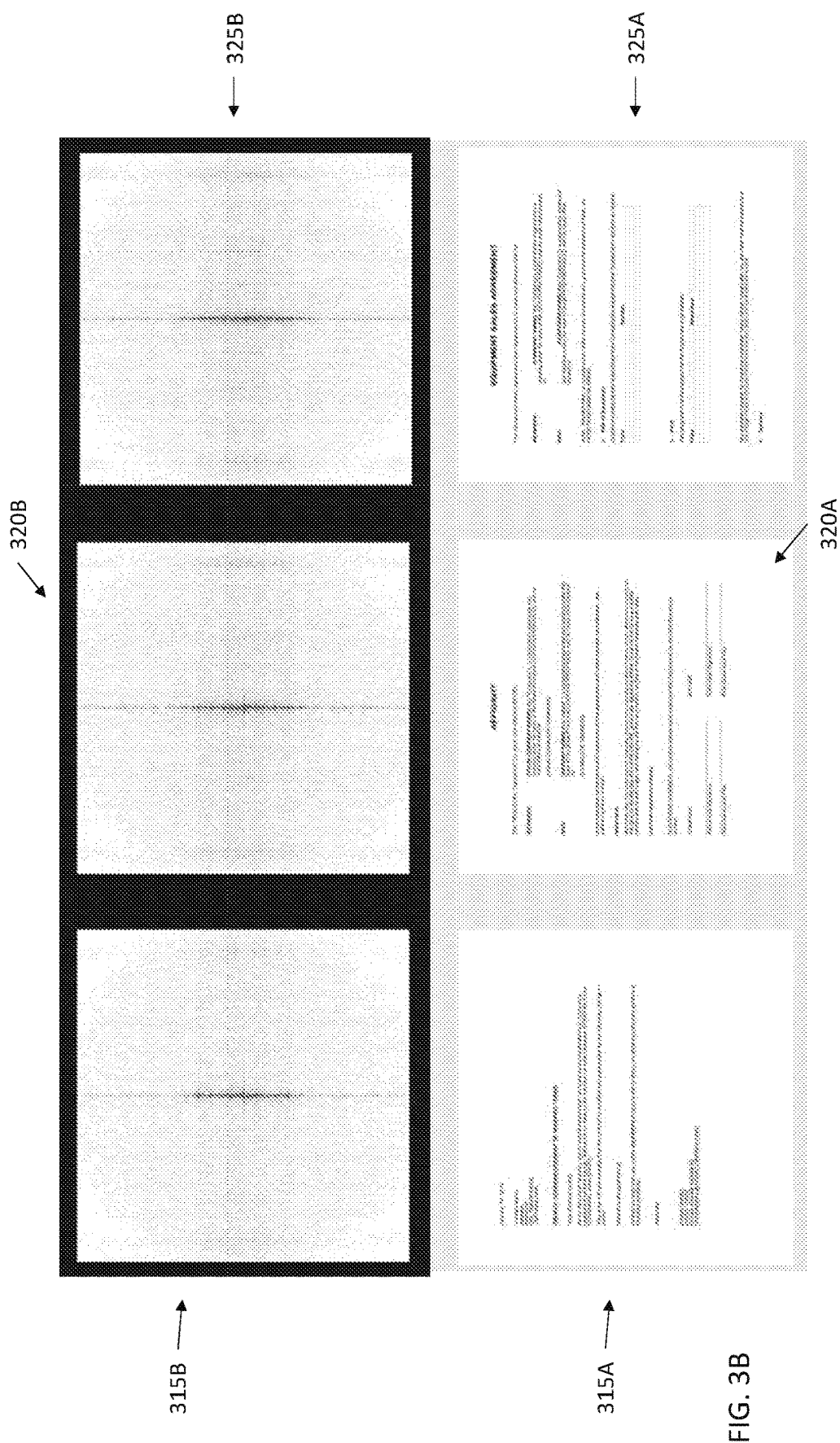

FIGS. 3A and 3B depict plan views of exemplary electronic documents along with Fourier transforms of each electronic document. A first collection of documents 300A, 305A, and 310A are shown in FIG. 3A along with spectral transforms 300B, 305B, and 305C associated with each document. The documents in this exemplary depiction include a "2015 FEDERAL BOOK DEPRECIATION SCHEDULE" document 300A, an "Emerging Trends: 2010 Through 2015" document 305A, and an "Employee Satisfaction Survey" document 310A. Some of the visually perceptible attributes of each document 300A-310A may have corresponding visual features in each corresponding spectral transforms 300B-310B. For example, both documents 300A and 310A a table-like structure having a strong periodic/frequency signal, which is reflected in the corresponding transforms 300B, 310B as strongly pronounced vertical and horizontal lines. These repeating lines in the tables of these documents create the artifacts in the corresponding spectral transform for each document. In contrast, the document 305A includes multiple graphics, shading, and solid coloration, which is reflected in the transform 305B as swirling patterns. Such patterns as exemplified in the transform 305B may be typical of a document having detailed designs and graphics (e.g., such as a painting).

A second collection of documents 315A, 320A, and 325A are shown in FIG. 3B along with spectral transforms 315B, 320B, and 325C associated with each document. The documents in this exemplary depiction include a formal letter document 315A, an "AFFIDAVIT" document 320A, and an "EQUIPMENT SALES AGREEMENT" document 325A. Some of the visually perceptible attributes of each document 315A-325A may have corresponding visual features in each corresponding spectral transforms 315B-325B. For example, although the documents 320A and 325A are different, they have some visually similar characteristics, such as the text shown on the top ¼ of the page. Accordingly, the spectral transforms 320B and 325B also have similar spectral features. Furthermore, the transform 320B appear visually more similar to the transform 325A than it does to the transforms 300B-310B shown in FIG. 3A. The less pronounced periodic signals in the documents 315A-325A make them visually distinct from the documents 300A and 310A possessing more pronounced periodic signals. Accordingly, a classification engine that relies on a sufficiently trained DNN may classify the documents 320A and 325A into the same classification and classify the documents 300A-310A into different classifications.

Although the spectral signatures depicted in the above figures may have a vertical line or x-shape, this representation is merely for ease of viewing purposes. An actual raw 2D Fourier transform of a document may appear different than the spectral signatures shown in the FIGS. 3A and 3B. For example, the depicted signatures in FIGS. 3A and 3B may be a visual representation of the 2D Fourier transforms of their respective documents processed through an fftshift( ) function provided by Matlab® software. In the depicted spectral signatures, the pixel distribution of each spectral signature may be an indication of periodic component. For example, the denser the pixels in a pattern, the more of a particular periodic element of a given group may be present. In various signatures shown, the center point of each spectral signature represents zero periodicity (meaning a non-periodic component). The depicted FFTs are shifted to show zero periodicity at the center rather than in the corners.

Figure 4:
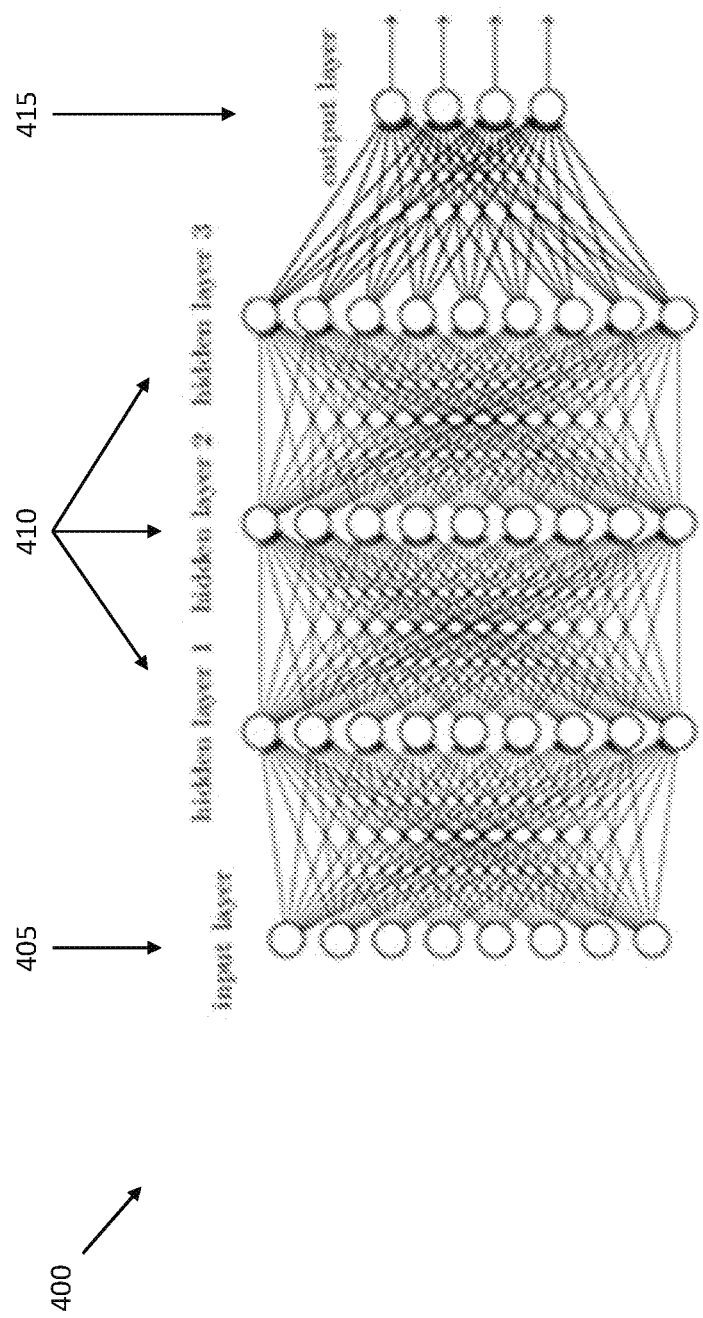
FIG. 4 depicts a diagrammatic view of an exemplary deep neural network DNN.

FIG. 4 depicts a diagrammatic view of an exemplary deep neural network DNN. A DNN 400 may be trained based on predetermined patterns and once trained, may take as an input a spectral signature of a document and output "correlation" values indicative of a level or similarity between the spectral signature of the document and the spectral signature of each predetermined pattern. For example, the DNN 400 may be trained based on (filtered) FFTs of the predetermined patterns, rather than the actual "raw" patterns themselves. The DNN 400 includes an input layer 405, at least one hidden layer 410 (including multiple neurons), and an output layer 415. Although the illustrative depiction of FIG. 4 depicts three hidden layers 410, the exact number of hidden layers may be significantly greater than three, in at least some embodiments. For example, there may be over a hundred hidden layers in an exemplary DNN model. Some hidden layers may include filtering (convolutional) layers, in various embodiments. A final Softmax calculation/layer, for example, may be a summation of a non-linear function from layers preceding the output layer 415.

Figure 5A:
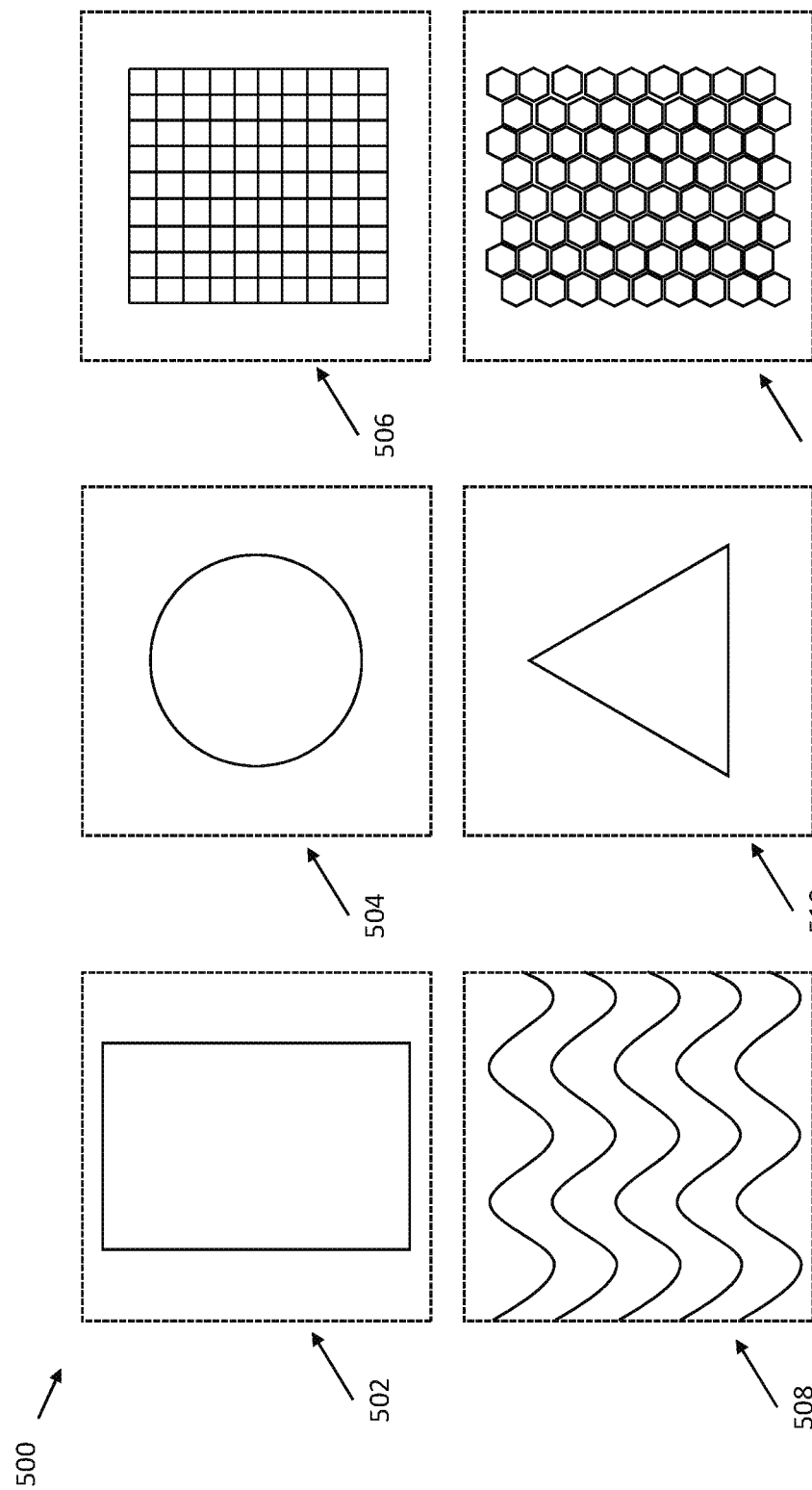
FIG. 5A depicts plan views of exemplary predetermined patterns used to train a DNN.

During a training phase, the connections and weighting between neurons of the hidden layer 410 may be generated and optimized according to a predetermined set of patterns represented in their spectral (FFT) form. Various weight backpropagation formulas used with the DNN may be included in already existing software packages, such as Microsoft® Cognitive Toolkit (CNTK) provided by Microsoft® Corporation, for example. Examples of these "predetermined patterns" are shown in FIG. 5A. After the training phase is complete and during a run phase, the DNN is configured to compare a spectral signature of a document to the spectral signatures of each of the predetermined patterns. In performing this comparison, the DNN will generate a list of "correlation" values that indicate how similar or dissimilar the spectral signature of the document is to the spectral signatures of each of the predetermined patterns. Each correlation values may be, for example, a cross-entropy value between the spectral signature of a specific document and the spectral signature of a specific predetermined pattern. In an illustrative embodiment, there may be seven different predetermined patterns on which the DNN is trained. In such a situation, during run time, the DNN will output an array of (floating point) numbers that respectively indicate a level of similarity or dissimilarity between the spectral signature of the document and the spectral signatures of each of the seven predetermined patterns (illustrated in FIG. 6). This set of numbers may be assembled into a "correlation vector" that is useful in clustering, classification, and searching operations. For example, the correlation vector output of the DNN may have the form:

$$X_{corr} = <X_1, X_2, \ldots X_N>$$

Where N is the number of predetermined patterns on which the DNN was trained. In the case of seven predetermined patterns, N=7. The values of each element of the correlation vector may be a real or floating-point number, for example, between −1 and 1 (e.g., [−1, 1]). A value near 1 may indicate a high level of correlation (higher visual/spectral similarity), while a value significantly lower than 1 may indicate a low level of correlation (higher visual/spectral dissimilarity). Furthermore, the DNN may be configured to use (as training inputs) multiple variations of each pattern that are slightly different from each original pattern. For example, the image processing engine 255 may take an original pattern, and generate 10, 100, or 1000 variations of that original pattern, all of which may then be used as training inputs for the DNN. These variations may be random affine transformation of the underlying image (see, e.g., FIG. 5B). In the case of seven predetermined patterns, for example, the DNN may, for each of the seven patterns, generate 1,000 different variations of each of the seven patterns. Put another way, each "base" pattern may produce, for example, around 1,000 training patterns that are variations/transformations of each "base" pattern. The variations may include translations, rotations, and or other transformations of each pattern, for example. These variations may aid the DNN in performing the comparisons and generating the correlation numbers discussed above.

FIG. 5A depicts plan views of exemplary predetermined patterns used to train a DNN. A set of patterns 500 includes a rectangle 502, a circle 504, a crosshatch 506, a set of sinusoidal (periodic) curves 508, a triangle 510, and a hexagonal lattice 512. During train mode, the DNN may train using the spectral representations of each pattern in the set of patterns 500. During run mode, a spectral signature of a document is processed through the DNN, thus resulting in the DNN generating the list of correlation values that each represent a level of (spectral) correlation between the input document and a specific pattern in the set of patterns 500. The size of the set of patterns may be any non-zero integer value (N). Other types of predetermined patterns may be used other than the exemplary patterns shown in FIG. 5A (e.g., a pattern may have a fractal shape or concentric circles shape, for example) Each pattern in the set of patterns 500 may be preselected to match visual features in a typical document page. For example, the crosshatch pattern 506 may be selected for matching with documents that have a table-like structure, such as a spreadsheet or an IRS tax return.

Figure 5B:
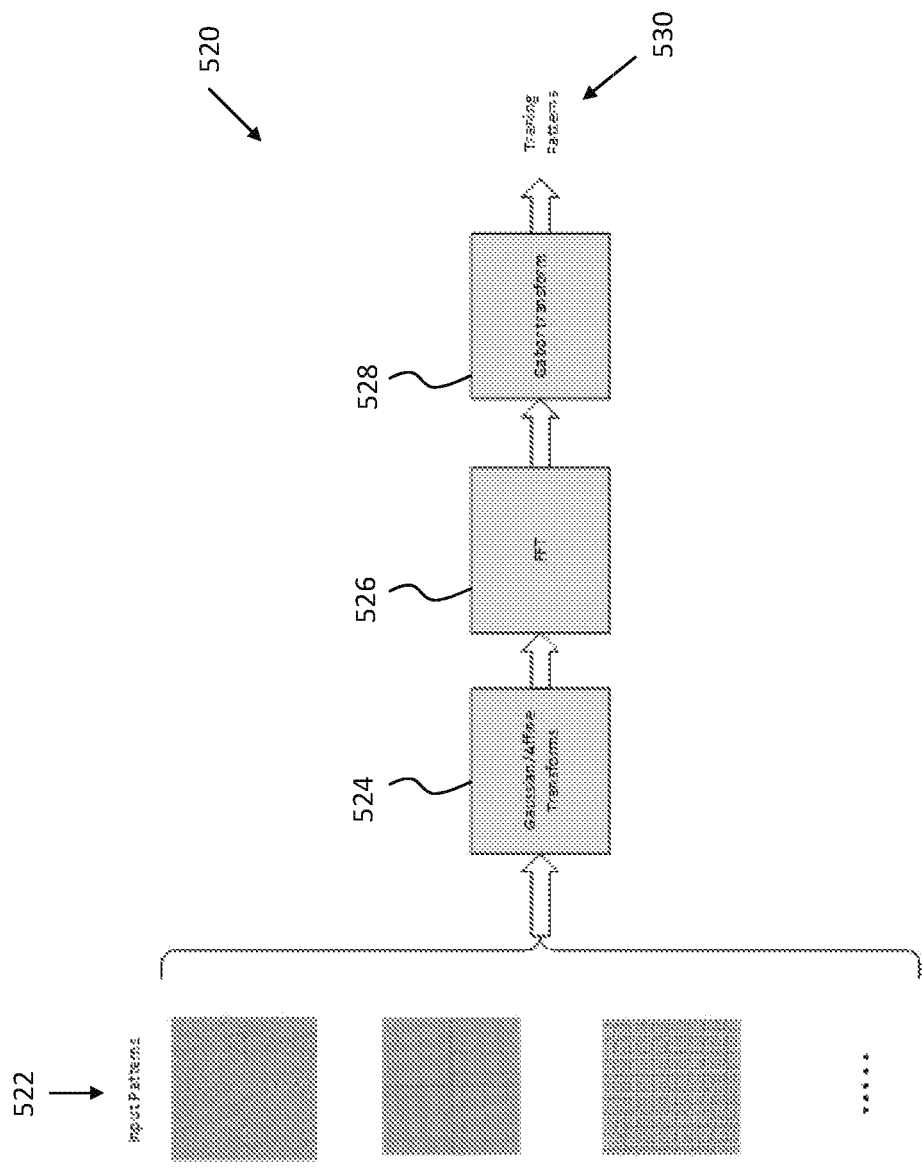
FIG. 5B depicts a flowchart diagram view of an exemplary pattern preparation process.

FIG. 5B depicts a flowchart diagram view of an exemplary pattern preparation process. A process 520 details the steps for building input patterns for DNN training. Process 520 begins with selecting a pattern from a set of predetermined patterns at step 522. The selected pattern is transformed using Gaussian/affine transformations at step 524, which generates multiple variations of the original selected pattern. One exemplary aspect of step 526 is that each pattern may be subjected to a Gaussian transform that adds "noise" to the samples. Next, each Gaussian/affine transformed pattern (e.g., each one of the 1,000 generated variations) are transformed again using an FFT to produce a pattern spectral signature at step 528. Next, the pattern spectral signature is transformed using an (optional) Gabor transform to add a "directionality" component to the pattern at step 530. After step 530, each fully transformed pattern is used as a training input for the DNN at step 530.

Figure 5C:
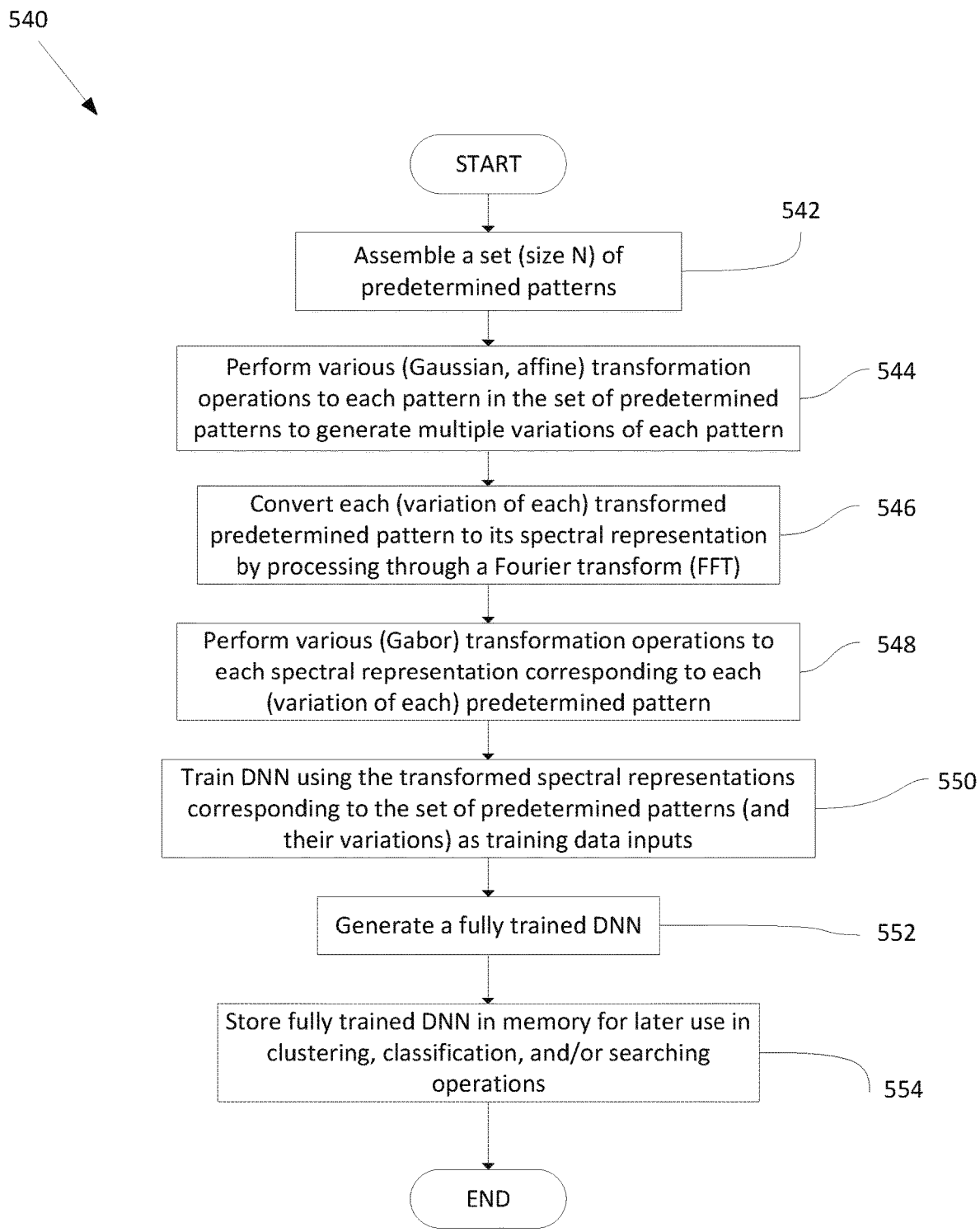
FIG. 5C depicts a flowchart view of an exemplary method for training a DNN (a "train-time process").

FIG. 5C depicts a flowchart view of an exemplary method for training a DNN (a "train-time process"). A training process 540 starts at step 542 with assembling a set (of size N) of predetermined patterns, which may, for example, be the set of patterns depicted in FIG. 5A. Next, at step 544 various transformation operations (e.g., Gaussian and/or affine transformations) are applied to each pattern in the set of predetermined patterns to generate multiple variations of each pattern. For example, a variation for a given predetermined pattern may be a translation, reflection, scaling, and/or rotation of the original predetermined pattern. Next, at step 546, the (Gaussian/affine) transformed predetermined patterns (and their variations) are then converted to their respective spectral representations using a Fourier transform (FFT). Next, at step 548 each spectral representation associated with each pattern (and each variation of each pattern) is transformed again using an (optional) Gabor transform. Next, at step 550, all of the (Gabor) transformed spectral representations are used as training inputs for a DNN. Next, at step 552, after training is complete, a fully trained DNN is generated. Finally, at step 554, the trained DNN is stored in memory for later use in classification/clustering and/or searching operations.

Figure 6:
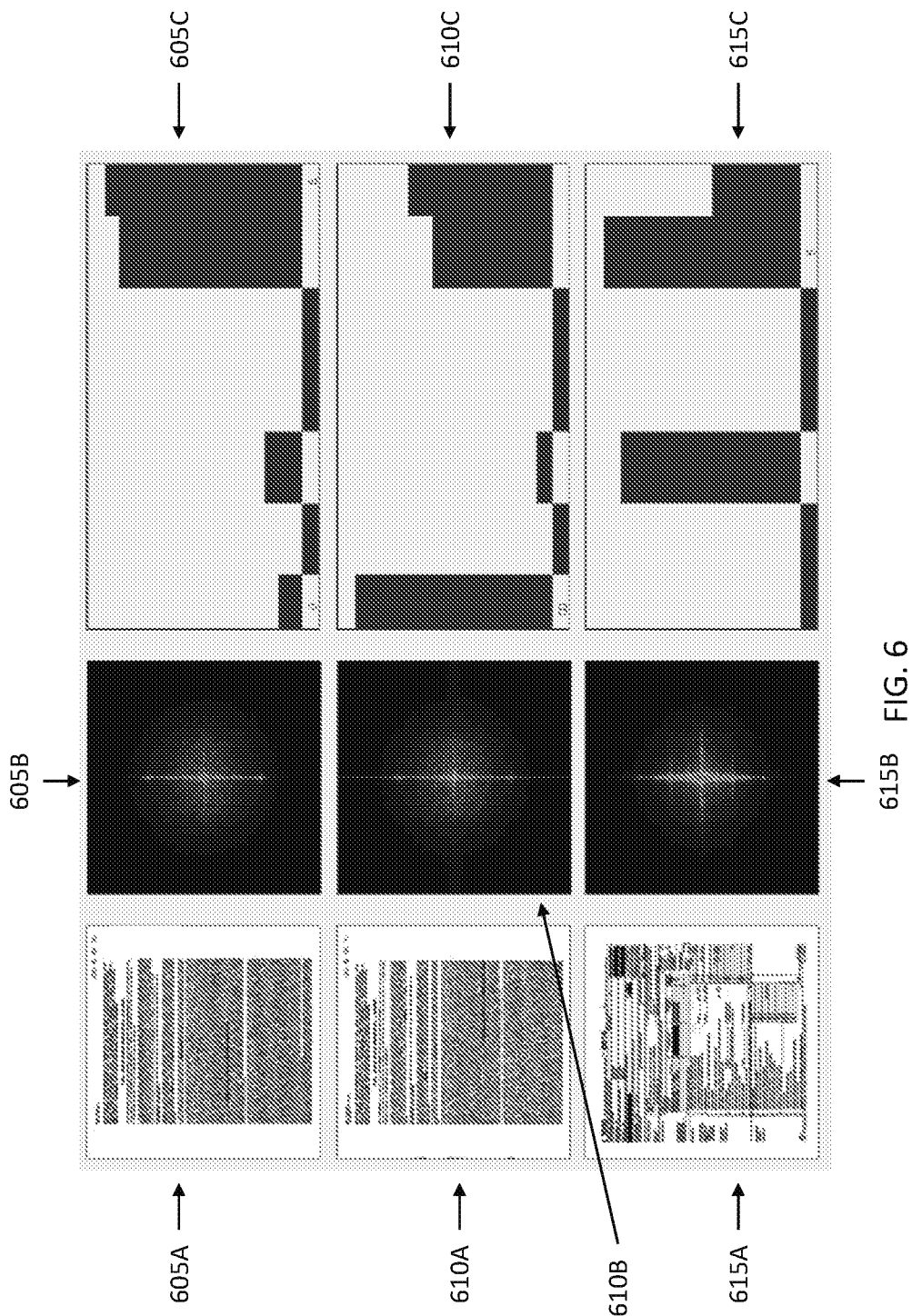
FIG. 6 depicts plan views of exemplary documents, spectral signatures associated with each document, and correlation vectors associated with each document.

FIG. 6 depicts plan views of exemplary documents, spectral signatures associated with each document, and correlation vectors associated with each document. Exemplary documents 605A, 605B, and 605C are shown, along with their associated spectral signatures 605B, 610B, and 615B. A pretrained DNN, during run mode, takes as an input one of the spectral signatures 605B, 610B, and 615B. For each document 605A, 610A, and 610C, the DNN will output a correlation vector, represented in this exemplary depiction by bar graphs 605C, 610C, and 615C. Each element of the correlation vector respectively indicates a level of similarity or dissimilarity between the spectral signature of each document and the spectral signatures of each pattern (and perhaps the generated variations of each pattern) in the set of predetermined patterns.

To elaborate with an illustrative example, in the depiction of FIG. 6, the output of the DNN indicates that: (1) there is a significant level of correlation (visual/spectral similarity) between the spectral signature 605B of the first document 605A and the spectral signatures of $6^{th}$ and $7^{th}$ predetermined patterns, and minimal correlation with the spectral signatures of the other predetermined patterns; (2) there is a significant level of correlation (visual/spectral similarity) between the spectral signature 610B of the second document 610A and the spectral signatures of $1^{st}$, $6^{th}$ and $7^{th}$ predetermined patterns, and minimal correlation with the spectral signatures of the other predetermined patterns; and (3) there is a significant level of correlation (visual/spectral similarity) between the spectral signature 615B of the third document 615A and the spectral signatures of the $3^{rd}$ and $6^{th}$ predetermined patterns, and minimal correlation with the spectral signatures of the other predetermined patterns. A clustering, classification, and/or searching system may use not only high levels of similarity (high correlation value, e.g., on the order of greater than 0.5 or 1), but also high levels of dissimilarity (low correlation value, e.g., on the order of less than 0.5 or 0) in determining the separation between classifications. In this sense, various systems disclosed herein may not only use "patterns that look like this" signals (high level of correlation and similarity), but also "patterns that do not look like this" signals (low level of correlation and high levels of dissimilarity) for clustering, classification, and/or searching. When these correlation vectors are used in clustering and classification, the system will (perhaps) classify the documents 605A and 610A as being in the same class, and the document 615A as being in a different class. These correlation vectors may also be used in performing document searches as detailed in FIG. 1B above.

Figure 7:
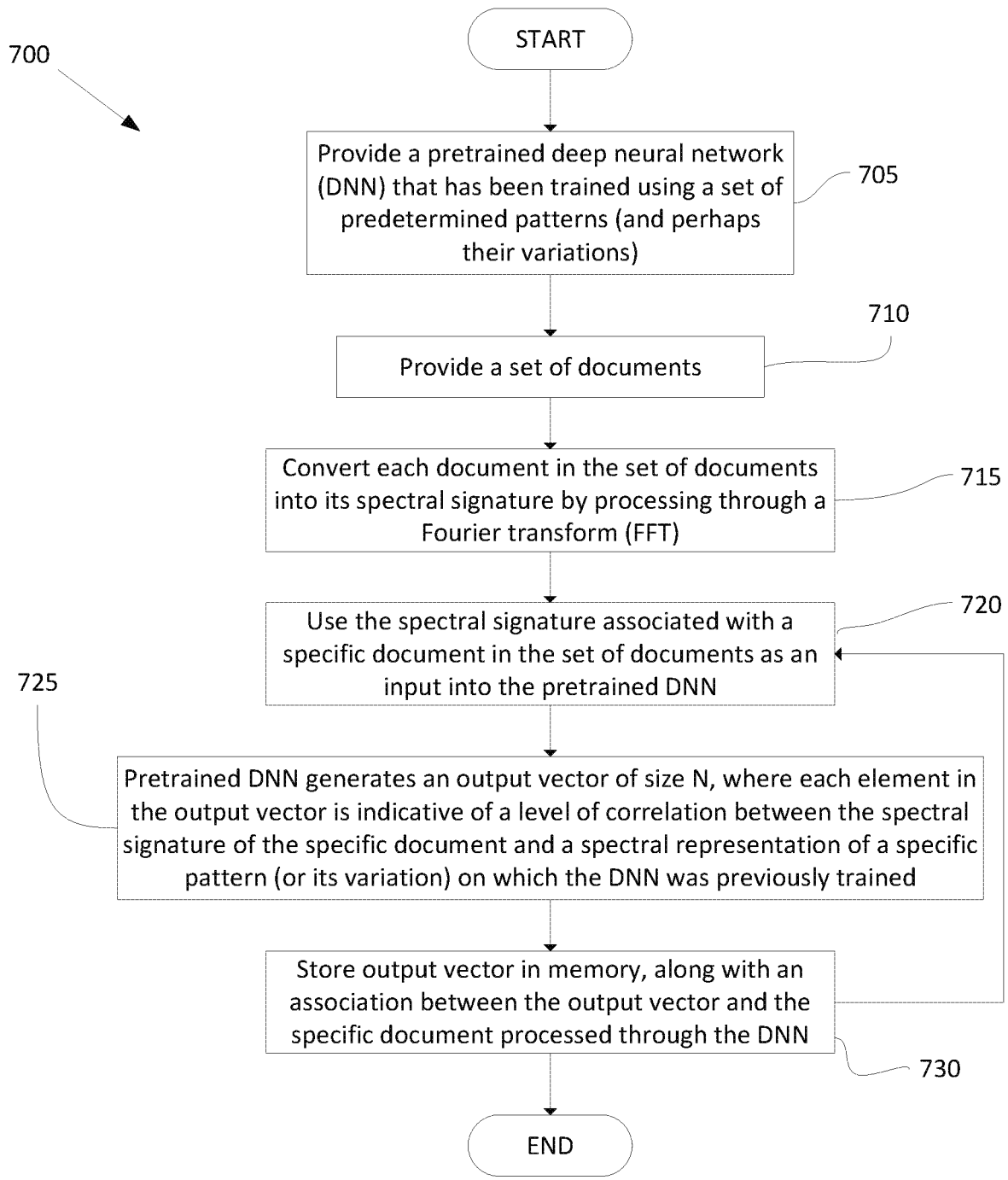
FIG. 7 depicts a flowchart of an exemplary method illustrating run mode (a "run-time" process) of a DNN.

FIG. 7 depicts a flowchart of an exemplary method illustrating run mode (a "run-time" process) of a DNN. A run mode process 700 starts at step 705 with providing a pretrained DNN (generated perhaps in the design/train-time process detailed in FIG. 5C), that has been trained using a set of predetermined patterns (and perhaps variations of the predetermined patterns as well). Next, at step 710, a set of documents is provided, which may, for example, be an unorganized set of documents a user wishes to classify and/or search. Next, at step 715, each document in the set of documents is converted to it spectral signature by processing each document through a Fourier transform (FFT). Next, at step 720, a spectral signature associated with a given document is used as a run-time input into the pretrained DNN. Next, at step 725 the pretrained DNN generates an output correlation vector (of size N) with each element of the vector indicating a level of correlation/similarity between the spectral signature of the specific document and a spectral representation of a respective pattern (or its variation) on which the DNN has already been trained. Next, at step 730, the correlation vector associated with the specific document is stored in memory, along with an association between the specific vector and the specific document. The process then repeats steps 720-730 for each document in the set of documents. In some examples, each output vector for each document is generated in parallel (e.g., multiple documents are run through the DNN simultaneously using multiple GPUs). The final result of this process is a collection of correlation vectors stored in memory, each associated with a respective document in the set of documents and indicating a level of similarity or dissimilarity between the spectral signature of the document and the spectral representation of each pattern (and perhaps its variations) in the set of predetermined patterns.

Figure 8A:
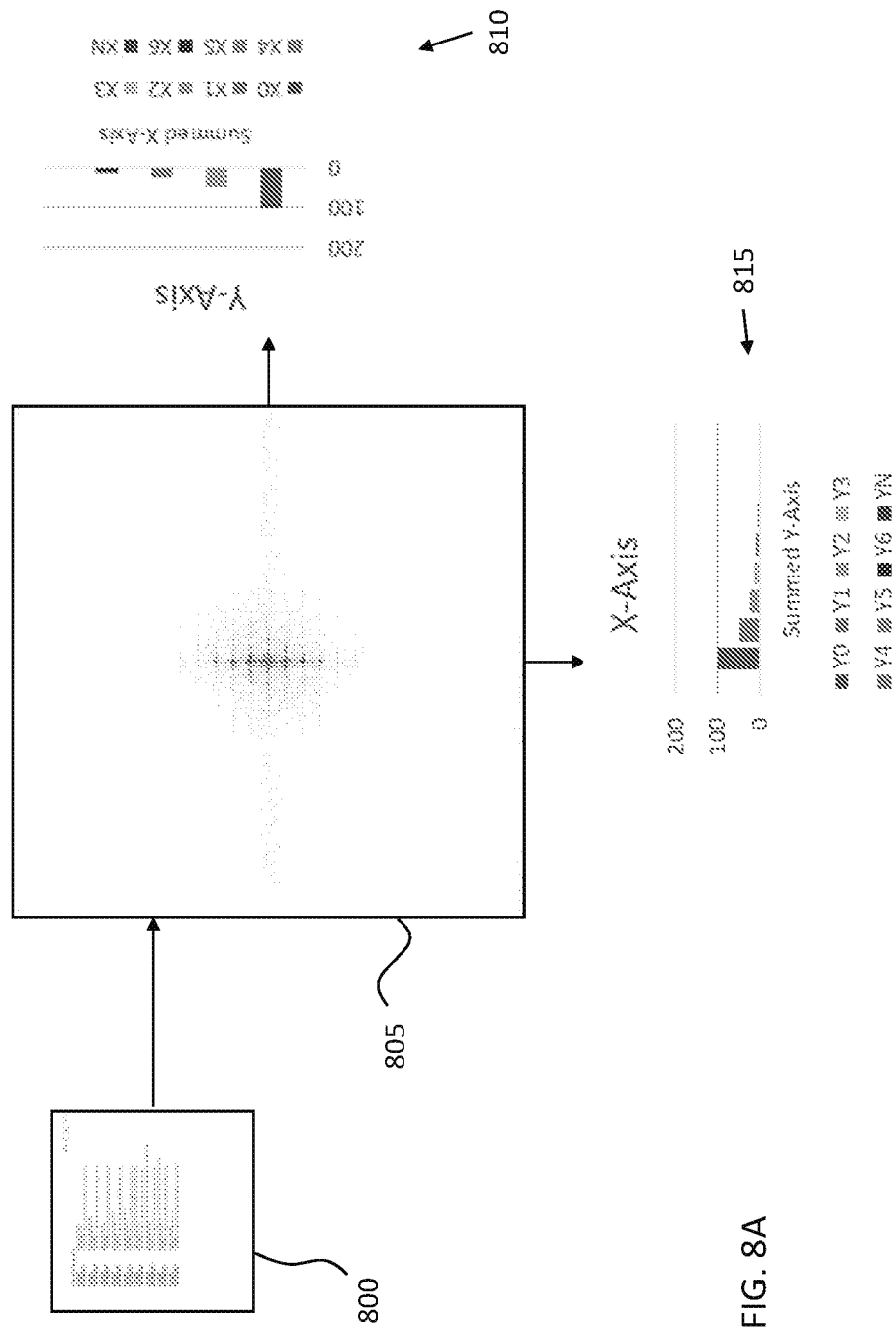
FIGS. 8A and 8B depict a plan views illustrating an exemplary spectral feature extraction step.
Figure 8B:
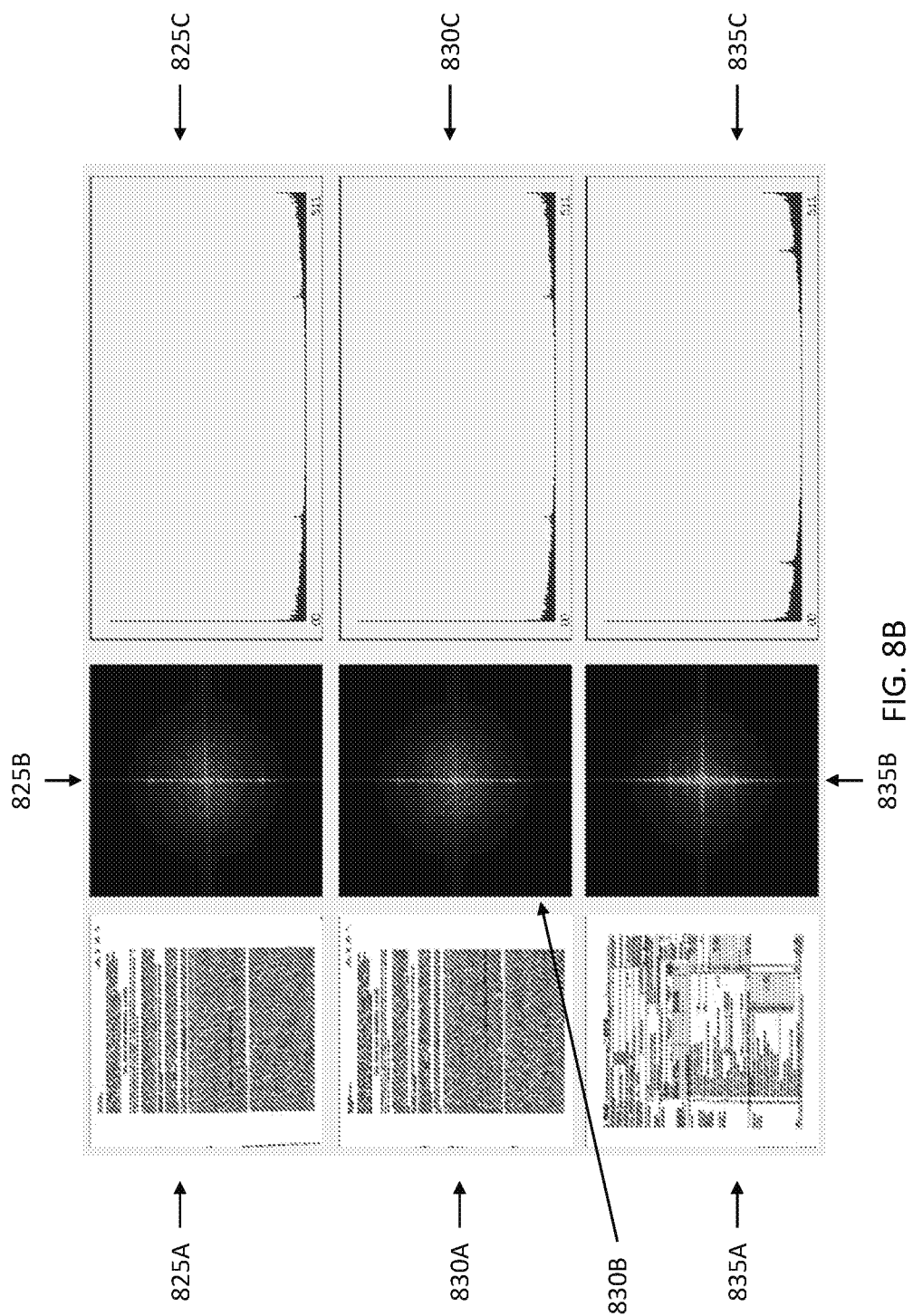

FIGS. 8A and 8B depict a plan views illustrating an exemplary spectral feature extraction step. As shown in FIG. 8A, after a document 800 has been translated into its spectral transform 805 (see, e.g., FIGS. 3A and 3B), an image processing engine or spectral analysis engine may extract at least one spectral feature from the transform 805 for use as an input in a clustering/classification application and/or a searching application. As shown in this exemplary depiction, one method for extracting unique distinguishing features from the transform 805 may be to generate "histograms" 810, 815 that sum up the value/intensity of the pixels in the transform 805 along a vertical and/or horizontal axis. Various embodiments of these histograms may pick out the "bumps" or "artifacts" in the spectral signature, which may be useful and reliable signals for use as inputs in clustering/ classification/searching applications. It is also worth noting that the FFT diagrams in FIG. 8B are "shifted" to better illustrate the spectrum. Specifically, the middle of each "shifted" FFT diagram shown in FIG. 8B are actually in the corners of the "raw" FFT diagram (that's why the histograms show peaks on the outside edges).

For example, an x-axis histogram plot 815 may be generated by summing up the intensity of each pixel on the transform 805 for a given y-value. In this depiction, histogram 815 has components that are the most intense at the horizontal center of the transform 805 (associated with zero periodicity), and monotonically decay (perhaps in an exponential fashion) moving to the right on the x-axis. In contrast, the histogram 810 has components that are the most intense at the vertical center of the transform 805 (associated with zero periodicity), and non-monotonically decay moving to upwards on the y-axis. The histogram 810 exhibits oscillating peaks that are associated with the strongly pronounced horizontal lines of the transform 805. Therefore, for each bar of the histogram 810 associated with a corresponding horizontal line of the transform 815, these bars will have a significantly greater "count" or "sum" than the bars associated with the areas in between the horizontal lines.

Each bar in each histogram 810, 815 may represent an element of a spectral feature vector used as a parameter input for (1) clustering of a collection of documents, (2) determining in which class the document 800 should be placed, and/or (3) searching for which documents are spectrally similar to the document 805. The spectral feature vector may include vector elements that are equivalent, scaled, or proportional to, the counts/sums for each bar of the at least one histogram 810, 815. These vector elements may capture/encode a unique feature associated with the spectral transform 805, which may be used for clustering/classification/searching.

FIG. 8B illustrates the differences between the spectral feature vectors of three exemplary documents, and how these differences can be used to reliably cluster/classify/search documents. A set of documents 825A, 830A, and 835A are shown along with their associated spectral representations 825B, 830B, and 835B. When a horizontal axis summing operation is performed on each spectral representation, a set of histograms 825C, 830C, and 835C are generated. Each histogram is essentially a visual depiction of a spectral feature vector, which may be represented by the formula:)

$$Y_{feat} = <y_1, y_2, \ldots y_k>$$

In this exemplary depiction, each vector 825C, 830C, and 835C includes 512 vector elements (K=512), each with their own magnitude. The horizontal "bumps" in each spectral representation are manifested as local maximums in each associated histogram, while the absence of any spectral intensity is associated with a near zero (or zero) magnitude value for a given vector element.

In this exemplary depiction, documents 825A and 830A are "OIL, GAS, AND MINERAL LEASE[S]," while the document 835A is an IRS "1040" tax form. To the naked eye, documents 825A and 830A appear visually similar, while the document 835A does not appear similar to the other two. In the spectral domain, the spectral feature vectors 825C and 830C also appear very similar (e.g., they have a similar profile with local maximums at approximately the same location/vector element). In contrast, the spectral feature vector 835C does not appear as similar (e.g., 835C has a different profile vs. 825C and 830C, along with different location for the local maximums and greater magnitude of the local maximums). Therefore, these spectral feature vectors may represent meaningful data that can be used to reliably classify documents into groups, and may also be useful in searching for documents that are spectrally similar to a search query document.

Figure 9:
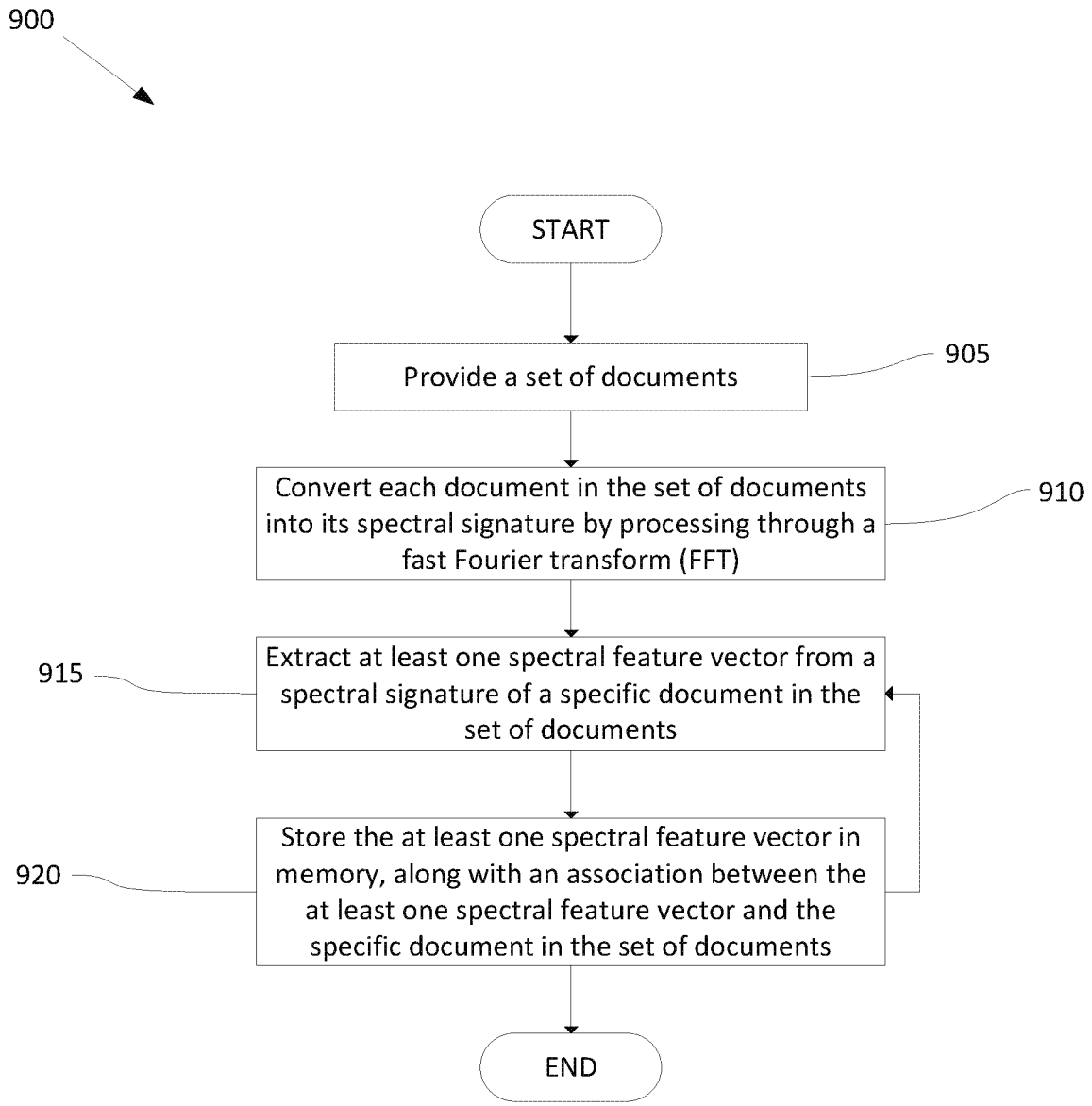
FIG. 9 depicts a flowchart of an exemplary method illustrating feature extraction step.

FIG. 9 depicts a flowchart of an exemplary method illustrating feature extraction step. A spectral feature extraction process 900 begins with providing a set of documents at step 905, which may be unorganized documents which require classification and/or searching through. Next, at step 910 each document is converted into its spectral signature using a fast Fourier transform (FFT). Next, at step 915 at least one spectral feature vector is extracted from the spectral signature of each document. Next, at step 920, the at least one spectral feature vector is stored in memory, along with an association between the at least one spectral feature vector and the specific document associated with that at least one spectral feature vector. The process then repeats steps 915-920 until all documents in the set of documents are processed. A final result of a collection of spectral feature vectors associated with each document in the set of documents may then be used later for clustering/classification/searching operations.

Figure 10A:
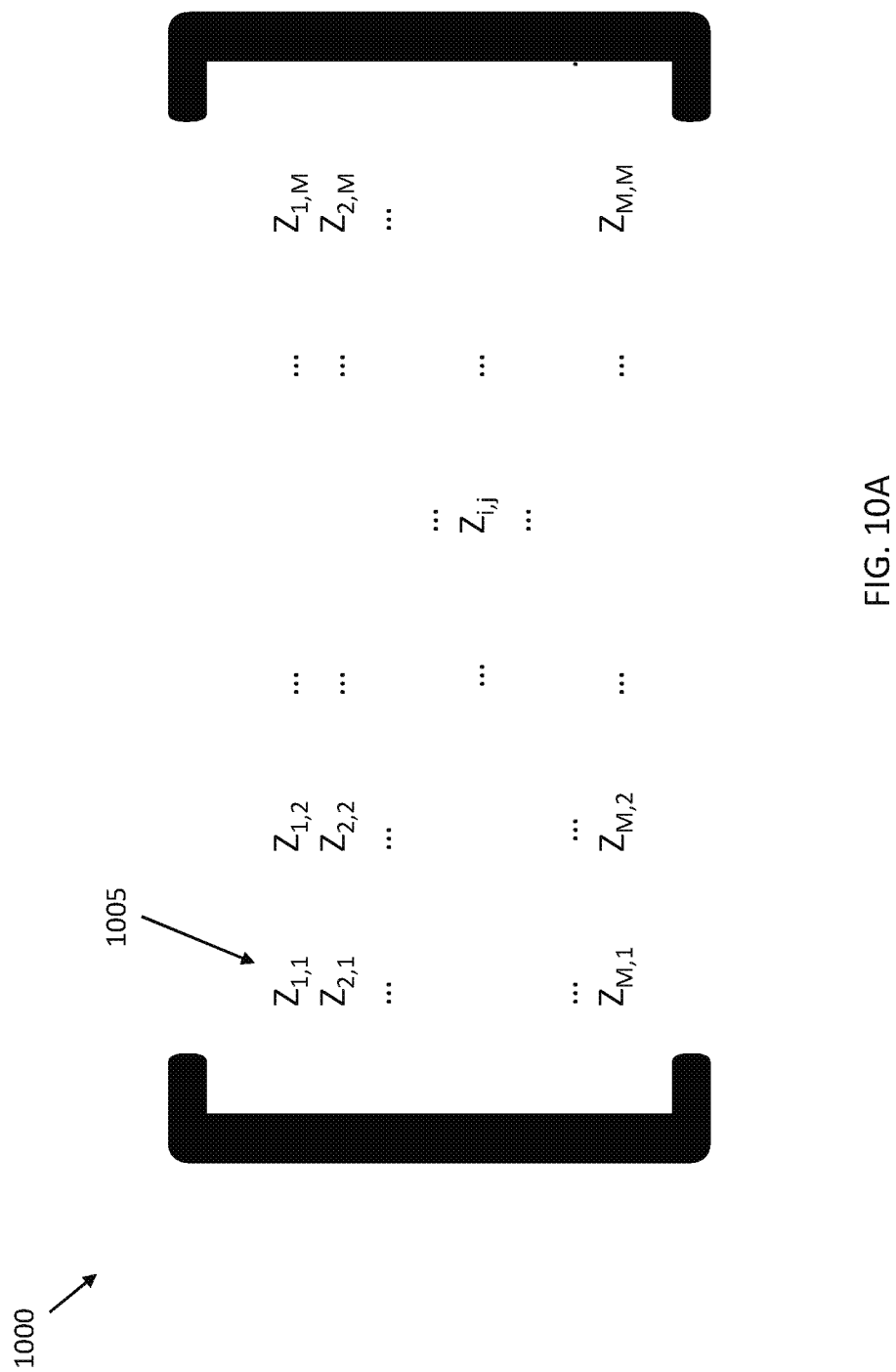
FIG. 10A depicts a plan view of an exemplary correlation matrix for use by a clustering/classification and/or searching engine.

FIG. 10A depicts a plan view of an exemplary correlation matrix for use by a clustering/classification and/or searching engine. At least one correlation matrix 1000 is used clustering/classifying (step 125, FIG. 1A) and/or finding (step 180, FIG. 1B) similar documents. A correlation matrix 1000 is an M×M square symmetric matrix. The correlation matrices consist of product moments of the spectral vectors extracted from each document. Specifically, each matrix element 1005 represents a level of correlation between a first vector associated with a first document and a second vector associated with a second document. A given document may have an associated correlation vector)(eon (see the discussion regarding FIGS. 6 and 7) and an associated spectral feature vector $Y_{feat}$ (see the discussion regarding FIGS. 8A, 8B, and 9). In some examples, these two vectors may be combined into a combined profile vector:

$$V_{profile} = X_{corr} \char`\^ Y_{feat} = <x_1, x_2, \ldots x_N, y_1, y_2, \ldots y_k>$$

A correlation operation may be performed on the first vector and the second vectors to generate a correlation value $Z_{i,j}$ that represents a level of correlation between the first vector associated with document (i), and a second vector associated with document (j). All possible permutations of documents (i) with documents (j) may be calculated to generate all of the correlation values $Z_{i,j}$ for the correlation matrix 1000.

For example, in the matrix shown in FIG. 10A, $Z_{1,1}$ represents the (Pearson product) correlation between a first vector associated with a first document and the (same) first vector associated with the (same) first document. Because these vectors are the same (both associated with the first document), the value of $Z_{1,1}$ is 1 (complete positive correlation). The same can be said for values $Z_{2,2}, Z_{3,3}, \ldots Z_{i,i}$ (the diagonal of the matrix 1000 is all 1's). In situations where i≠j, the corresponding entry $Z_{i,j}$ of the matrix is generated by calculating the (Pearson product) correlation between a vector of document (i) and a vector of document (j). Similarly, the entry $Z_{j,i}$ will have the same value as the entry $Z_{i,j}$, since the correlation between document (i) and document (j) is equal to the correlation between document (j) and document (i). This symmetry of the entries $Z_{i,j}/Z_{j,i}$ of matrix 1000 is why the matrix 1000 is a square symmetric matrix. Furthermore, the size of the matrix 1000 is M×M, which means there is an integer number M of documents being used to generate this correlation matrix. After being generated/assembled, the correlation values in the correlation matrix 1000 may then be used as an input to a clustering algorithm (e.g., self-organizing map or K-means clustering) for use in clustering/classification, and/or may be used as an input for searching operations.

Figure 10B:
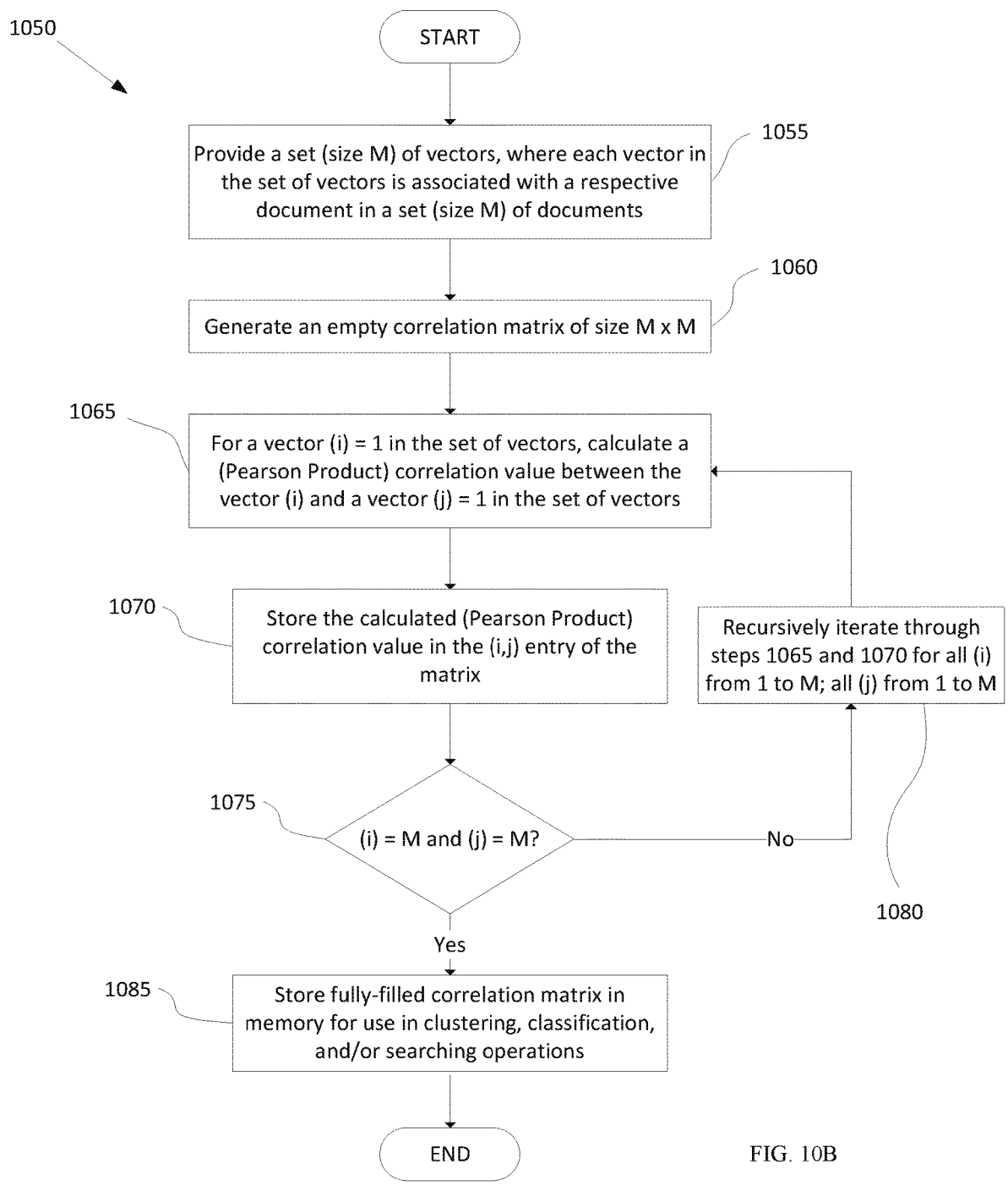
FIG. 10B depicts flowcharts illustrating an exemplary correlation matrix generation process.

FIG. 10B depicts flowcharts illustrating an exemplary correlation matrix generation process. A correlation matrix generation process 1050 begins with a step 1055 of providing a set of vectors associated with a set of documents. The size of the set of vectors is size M, and the size of the set of documents is also size M (there is one vector associated with each document). In some examples, each vector in the set of vectors may be a correlation vector $X_{corr}$ (see the discussion regarding FIGS. 6 and 7) associated with a respective document in the set of documents. In some examples, each vector in the set of vectors may be a spectral feature vector $Y_{feat}$ (see the discussion regarding FIGS. 8A, 8B, and 9) associated with a respective document in the set of documents. In some examples, each vector in the set of vectors may be a combined profile vector $V_{profile}$ (see the discussion regarding FIG. 10A) associated with a respective document in the set of documents.

The process 1050 then continues to step 1060, where an empty matrix of size M×M is generated. This matrix may be an empty version of the matrix 1000 depicted in FIG. 10A. Next, at step 1065, starting at (i)=1 and (j)=1, a (Pearson product) correlation value is calculated between the vector (i) and the vector (j). Next, at step 1075, the method 1050 performs a logic operation to determine whether (i)=M and (j)=M. If either (i) or (j) do not equal M at step 1075, the method 1050 recursively iterates through steps 1065 and 1070 for all values of (i) and (j) from 1 to M. This step may be equivalent to calculating the (Pearson product) correlation for every permutation of vectors (i) and (j). Once the loop 1080 is finished (once the logic operation (i)=M and (j)=M is true), the process 1050 continues to step 1085, where a fully filled-out/occupied matrix is stored in memory for later use in clustering, classification, and/or searching. In some implementations, at this point in the process (step 1085), various systems and methods disclosed herein may only require the data contained within the correlation matrix. For example, once the correlation matrix has been completely filled out, the spectral feature vectors, correlation vectors, raw documents, and the spectral signatures of the documents may not be used for any further calculations in clustering, classification, and/or searching.

In various examples, multiple matrices may be produced, which may then be used to produce statistical profiles. For example, a first correlation matrix may contain the Pearson product correlation values for all permutations of correlation vectors $X_{corr,i}$, $X_{corr,j}$, a second correlation matrix may contain the Pearson product correlation values for all permutations of spectral feature vectors $Y_{feat,i}$, $Y_{feat,j}$, and a third correlation matrix may contain the Pearson product correlation values for all permutations of profile vectors $V_{profile,i}$, $V_{profile,j}$. In various examples, multiple correlation matrices may be used to increase the accuracy of clustering, classification, and/or searching. For example, in a preferred embodiment, one matrix may be generated using the DNN output correlation vectors $X_{corr}$, and four matrices may be generated using the spectral feature vectors $Y_{feat}$. These five matrices, in this exemplary illustration, may represent values in a 5-dimensional space. A process may then find centroids using these five matrices, and then group them in a way that minimizes the distances from the centroids.

Figure 11:
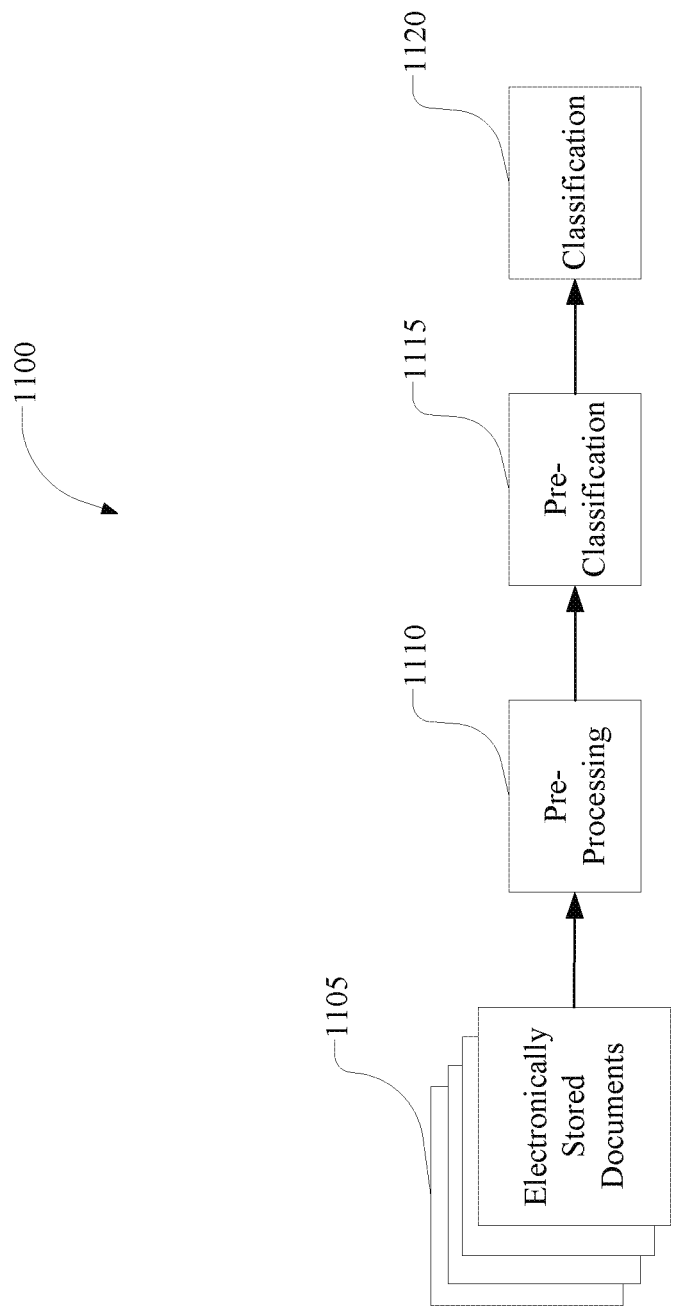
FIGS. 11, 12A, 12B, and 12C depict flowcharts illustrating an exemplary classification process using a pre-trained DNN.

FIGS. 11, 12A, 12B, and 12C depict flowcharts illustrating an exemplary classification process using a pre-trained DNN. FIG. 11 illustrates an exemplary three-phase process 1100 used to cluster visually similar documents using the proposed methods in some embodiments, while FIGS. 12A-12C individually depict the respective phases of the three-phase process. Starting with step 1105, a process begins with assembling together a collection of electronically stored documents (of type PDF, TIF, or DOC, for example), which are desired to be organize/categorized/classified. This collection of documents may be fed to a DNN system for classification/processing. In phase 1110, the documents are processed through a pre-processing phase. Next, at phase 1115 the pre-processed documents are processed through a pre-classification phase. Next, at phase 1120 the pre-classification documents are processed through a classification phase.

Figure 12A:
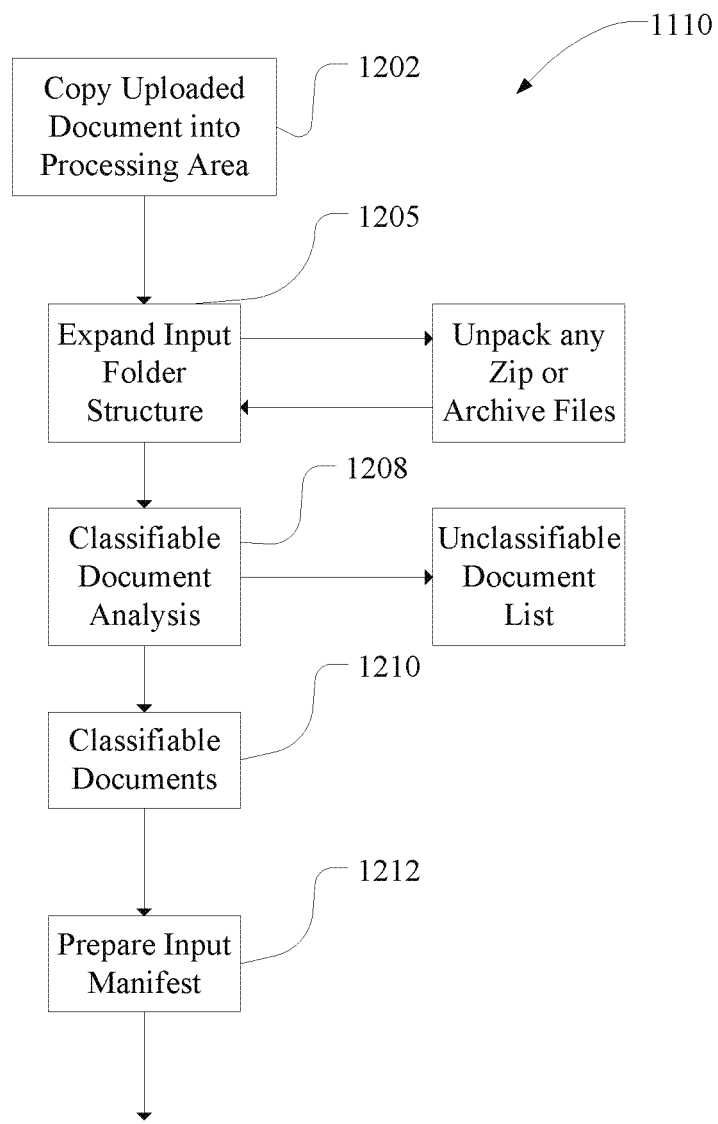

FIG. 12A depicts a flowchart diagram exemplifying the first phase 1110 (pre-processing) of the three-phase process 1100 exemplified in FIG. 11. Various aspects of the first phase 1110 may be implemented by the pre-processing engine 270 depicted in FIG. 2, for example. In the first phase 1110, the documents are subjected to set of pre-processing steps, which prepare the documents for classification. The first phase starts at step 1202 with a copy of the documents being loaded into a processing area. Next, at step 1205 the input folder is expanded, and any zip or archive files are unpacked. Next, at step 1208, classifiable document analysis is performed, where the system may examine the collection of documents to determine which documents can be classified. Any documents rejected by the system at this point may be placed in an "Unclassifiable" category where an unclassifiable document list may be produced. This may include documents that have types that are unknown to the system. Next, at step 1210, classifiable documents are presented. Documents may also be separated according to size and orientation (e.g., landscape vs. portrait or A4 paper size vs. US Letter paper size). Next, at step 1212, the system prepares an input manifest that may include of program structures that are populated with additional document information that is created during the classification steps.

Figure 12B:
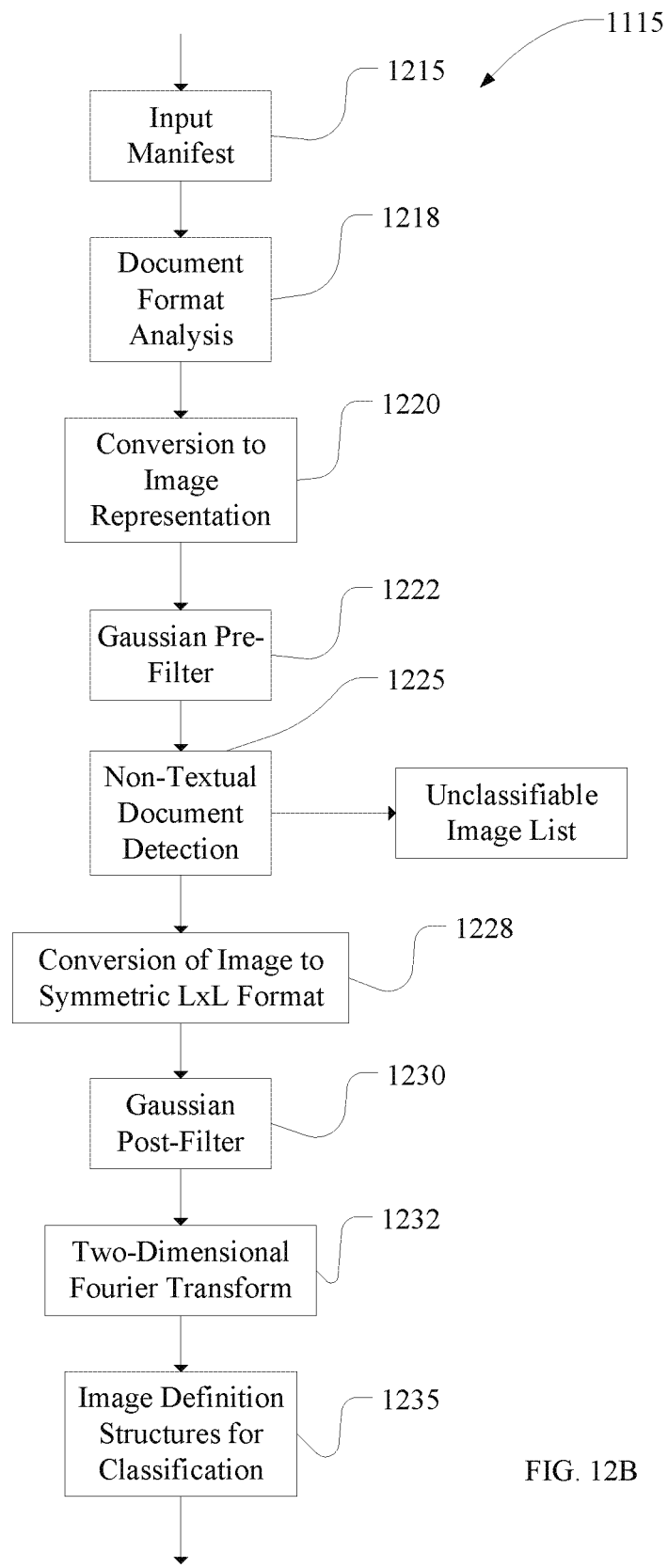

FIG. 12B depicts a flowchart diagram exemplifying the second phase 1115 (pre-classification) of the three-phase process 1100 exemplified in FIG. 11. Various aspects of the second phase 1115 may be implemented by the document transformation/processing engine 255, spectral analysis engine 260, and/or pre-classification engine 275 depicted in FIG. 2, for example. In the first step of the second phase 1115, input manifest from previous step 1212 is fed to the computing system. Next, at step 1218, the system performs document format analysis, which may include determining document orientation. Next, at step 1220, the documents are converted to an image representation (e.g., a bitmap format such as BMP, GIF, or JPEG). Next, at step 1222, the image representations generated in previous step 1220 go through Gaussian pre-filtering (smoothing). Next, at step 1225, a non-textual document detection is performed to determine whether the document is a non-textual document, such as an abstract painting or a picture, for example. If the image is a non-textual document, then it is placed in an unclassifiable image list. Next, at step 1228, the system converts the image to symmetric (L×L) format (e.g., a square). The step 1228 may involve rescaling, interpolation of bits, and/or compression of pixels of the original image to generate the symmetric format image. Next, at step 1230, the system applies a Gaussian post-filter (smoothing) to the symmetric formatted images. Next, at step 1232, the system applies a two-dimensional Fourier Transform on the symmetric formatted images (which may, for example, be performed using a Fast Fourier Transform (FFT)) to generate spectral image signatures for each document. Next, at step 1235, the system generates image definition structures for classification. The image definition structures containing the results of the Fourier Transform may then be fed to the classification stage (phase 3 detailed below). In various examples, step 1235 may include filtering and extracting peaks and valleys in the spectral signatures of documents to generate a definition structure. Step 1235 may, for example, include extraction of the spectral feature information exemplified in FIGS. 8A and 8B to generate at least one spectral feature vector.

In some embodiments, at least some of the documents accepted during the pre-classification phase 1115 may be converted to an internal image format. During phase two, document formatting may be maintained, as the document format may be a primary source of classification features. Before the image prepared in the first phase is presented to a spectral analysis engine, a variety of pre-filtering operations may be performed on the document image. Such filtering operations may include applying Gaussian kernels to the image and mapping the image to a symmetric matrix in a way that maintains the document format, for example.

Figure 12C:
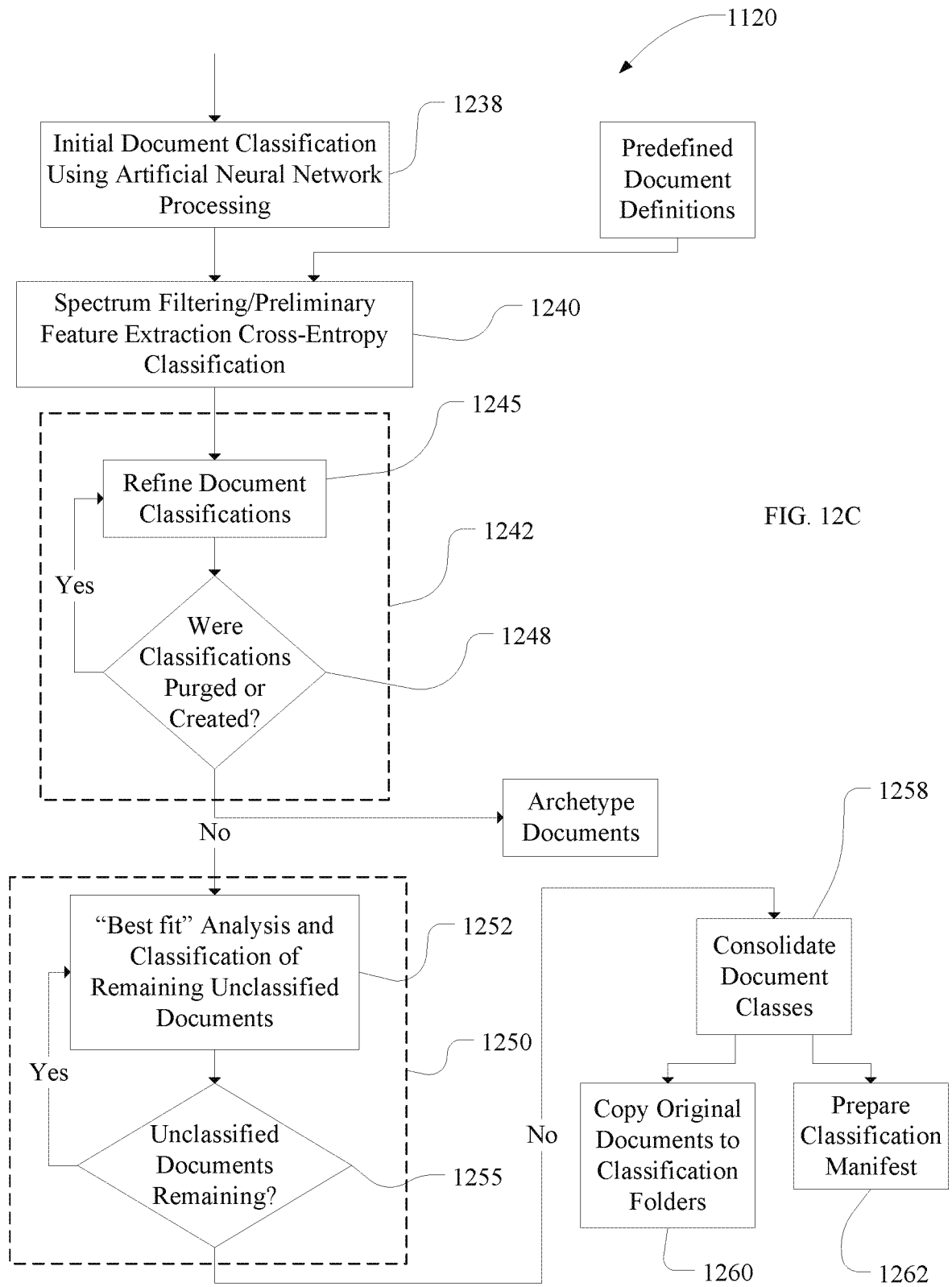

FIG. 12C depicts a flowchart diagram exemplifying the third phase 1120 (classification) of the three-phase process 1100 exemplified in FIG. 11. Various aspects of the third phase 1120 may be implemented by the machine learning/DNN engine 265 and/or classification engine 285 depicted in FIG. 2, for example. The third phase 1120 starts with the step 1238. At step 1238, the spectral signatures are fed into a DNN that has been pre-trained using a set of image patterns that have been designed for efficient discrimination of artifact patterns within printed documents. The DNN may generate cross-probability/entropy vectors (e.g., the correlation vectors described with respect to FIG. 6) that are used throughout the remaining classification steps as additional classification criteria. The DNN may be trained using a form of "adversarial" or "competitive" training that permits discrimination of patterns by considering patterns that are absent as well as patterns that are present (e.g., positive and negative learning). Next, at step 1240, the image spectral definition structures (received from previous step 1235) are filtered to extract feature and statistical information that it used in subsequent classification processes. Examples of such feature and statistical information may include the histogram information depicted in FIGS. 8A and 8B. The filter in step 1240 may include proprietary kernels (e.g., Gabor transforms) that are applied to extract feature information from the document spectra.

Next, at step 1242 a recursive clustering analysis is performed whereby documents may be repeatedly re-processed within the framework of the self-organizing map to refine the classification of each document. As a subroutine 1245 of step 1242, document classifications may be refined in a recursive process, where the mathematical profiles of each document class may be adjusted as new documents are added to the class. As another subroutine 1248 of step 1242, within each recursive step, document classifications are pruned and/or created using information extracted in the step 1245. After step 1242, the system may generate an output which may include a set of "archetype" documents which may be\used as a basis for further classification and document-type search (e.g., for a "more like this" search). For example, statistical analysis may minimize the average variance of a given cluster to produce a "tight" set of centroids (k-means). A "tight" set of centroids may be defined comparatively as a relatively low standard deviation in a cluster, and may be dependent on the DNN being used, as well as other factors (such as the number of sample documents). Various statistical techniques may also be used to prune outliers (e.g., over 1.5 times the interquartile range). These centroids may represent a cluster of highly similar documents that exclude outliers. The centroid boundaries may then be expanded to include the maximum number of documents without producing too many false positives. In various implementations, archetypes may be of two types: (1) documents that are determined by the system to be "identical," meaning that the spectral analysis variance between them is not significant when considered against the universe of documents being classified in a given batch (using a SOM); or (2) groups of documents provided to the system that are manually determined to be similar (using a Bloodhound search).

Next, at step 1250, additional feature extraction may be performed in a framework. A subroutine of step 1250 may include step 1252 where document reclassification may be performed using the spectra of the "archetype" document sets produced earlier. Another subroutine of step 1250 may include step 1255 where the documents are reviewed and, when determined to meet certain statistical criteria, are reallocated to classification sets. After step 1250, class consolidation may be performed at step 1258 as a (final) classification step, whereby the categories that have been created may be re-examined to find document classifications that contain "similar" documents. Classifications that meet a "similarity" threshold may be merged together, in various examples. Next, at step 1260 the classification information may be used to prepare a downloadable structure that includes of a directory tree containing groups of classified documents, as well as all documents that were deemed unclassifiable. At step 1262, a manifest may be produced that documents the final classification results.

Figure 13A:
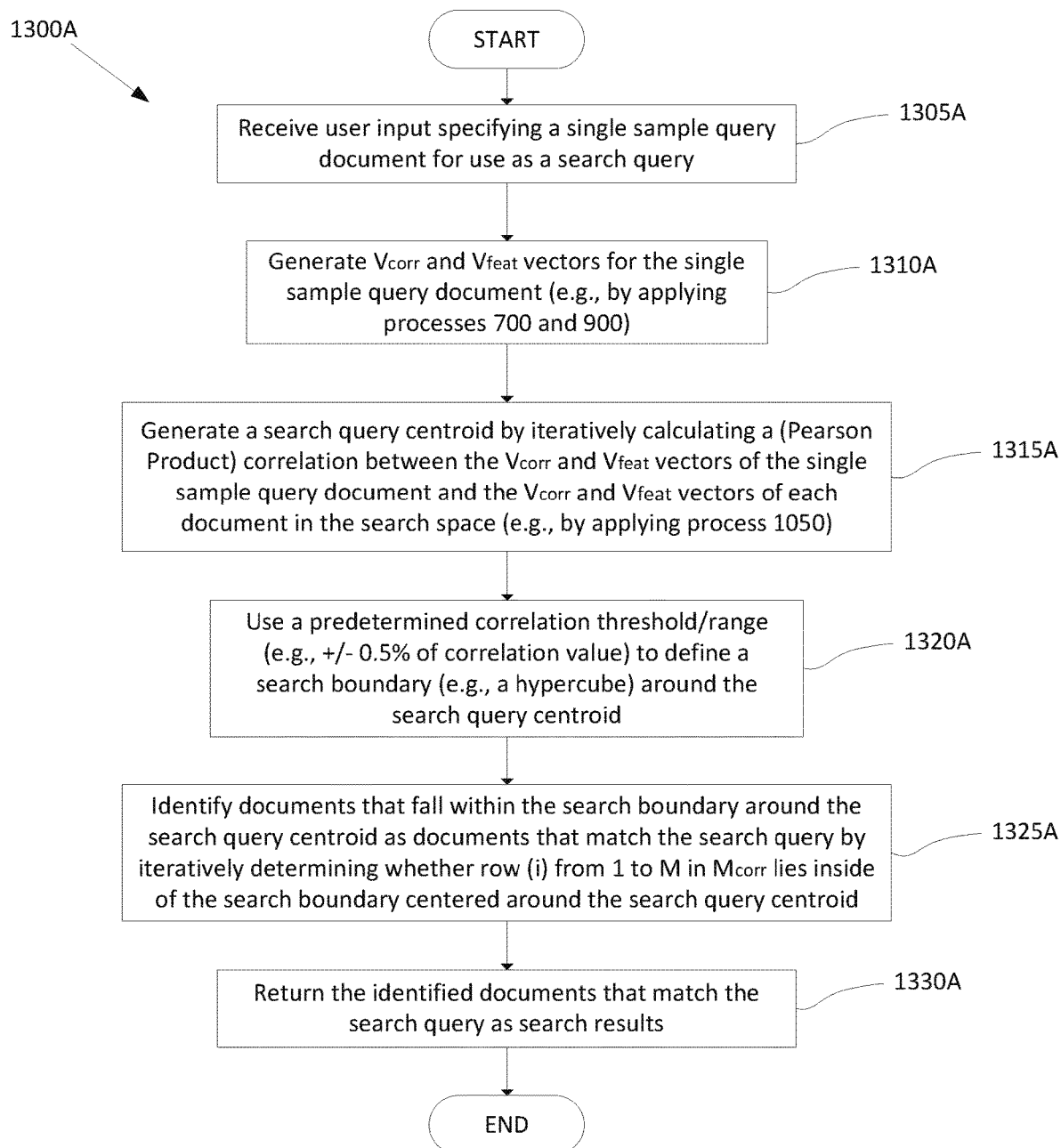
FIG. 13A depicts a flowchart illustrating an exemplary search process using a single sample query document as a search query.

FIG. 13A depicts a flowchart illustrating an exemplary search process using a single sample query document as a search query. A search process 1300A for matching search results to a single sample query document begins at step 1305A with a computer system receiving user input that specifies or selects only one sample query document (an "exemplar" or "exemplary document") for use as a search query. Next, at step 1310A, the system generates $V_{corr}$ and $V_{feat}$ vectors for the single sample query document (e.g., by performing substantially the same process steps 700 and 900 depicted in FIGS. 7 and 9). Next, at step 1315A, the system will generate a search query centroid (represented as a vector of length M) by iteratively calculating a (Pearson product) correlation between the $V_{corr}$ and $V_{feat}$ vectors associated with the single sample query document, and the $V_{corr}$ and $V_{feat}$ vectors associated with each of the documents in the search space (which is the set documents being searched through). Step 1315A may include steps substantially similar to the process steps 1050 depicted in FIG. 10B (although step 1315A may not iterate through (i), but rather only iterate through (j) from 1 to M, as detailed in step 1080). Next, at step 1320A the system will use a predetermined correlation threshold/range to define a search boundary in multidimensional space that is centered around the search query centroid. For example, a predetermined correlation threshold of about 95%, 99%, or about 99.5% of each correlation value element in the search query centroid vector may be used to define a "hypercube" in M-dimensional space with the search query centroid as its center point. Next, at step 1325A, the system will identify which rows entries in the Meow matrix (which may have already been generated using process 1050) fall within the search boundary defined at step 1320A. If a given row of the $M_{corr}$ matrix falls within the search boundary hypercube (in M-dimensional space), then the document associated with that row will be considered as a "hit" that matches the search query. Next, at step 1330A, the system will assemble the list of search hits as a collection of search results, which may be displayed to a user in the GUI shown in FIG. 14.

In an illustrative example, say that the first row of $M_{corr}$ has the following values: $Z_{1,1}=1$, $Z_{1,2}=0.5$, $Z_{1,3}=0.7$, and $Z_{1,4}=-0.4$. In performing the process steps 1310A and 1315A, the system generates a vector value for the search query centroid of $SQC_1=1$, $SQC_2=0.51$, $SQC_3=0.68$, and $SQC_4=-0.405$. Then, using a predetermined correlation threshold of 99%, the first row of $M_{corr}$ would be a search "hit," since each of the values of $Z_{1,1}$-$Z_{1,4}$ fall within 99% of each of the associated values of $SQC_1$-$SQC_4$. Therefore, the document associated with the first row of $M_{corr}$ would be a search hit that is returned as a search result in step 1330A. Assuming instead that the first row of $M_{corr}$ has the following values: $Z_{1,1}=1$, $Z_{1,2}=0.5$, $Z_{1,3}=0.7$, and $Z_{1,4}=-0.5$, then in this case, the first row of $M_{corr}$ would not be a search hit, because the last vector element of that row ($Z_{1,4}$) falls outside of a 99% range of the value of $SQC_4$ (in other words, −0.5 does not fall within the range of −0.4+/−0.04, where the value +/−0.04 is 1%=100%−99% of the value of −0.4).

Figure 13B:
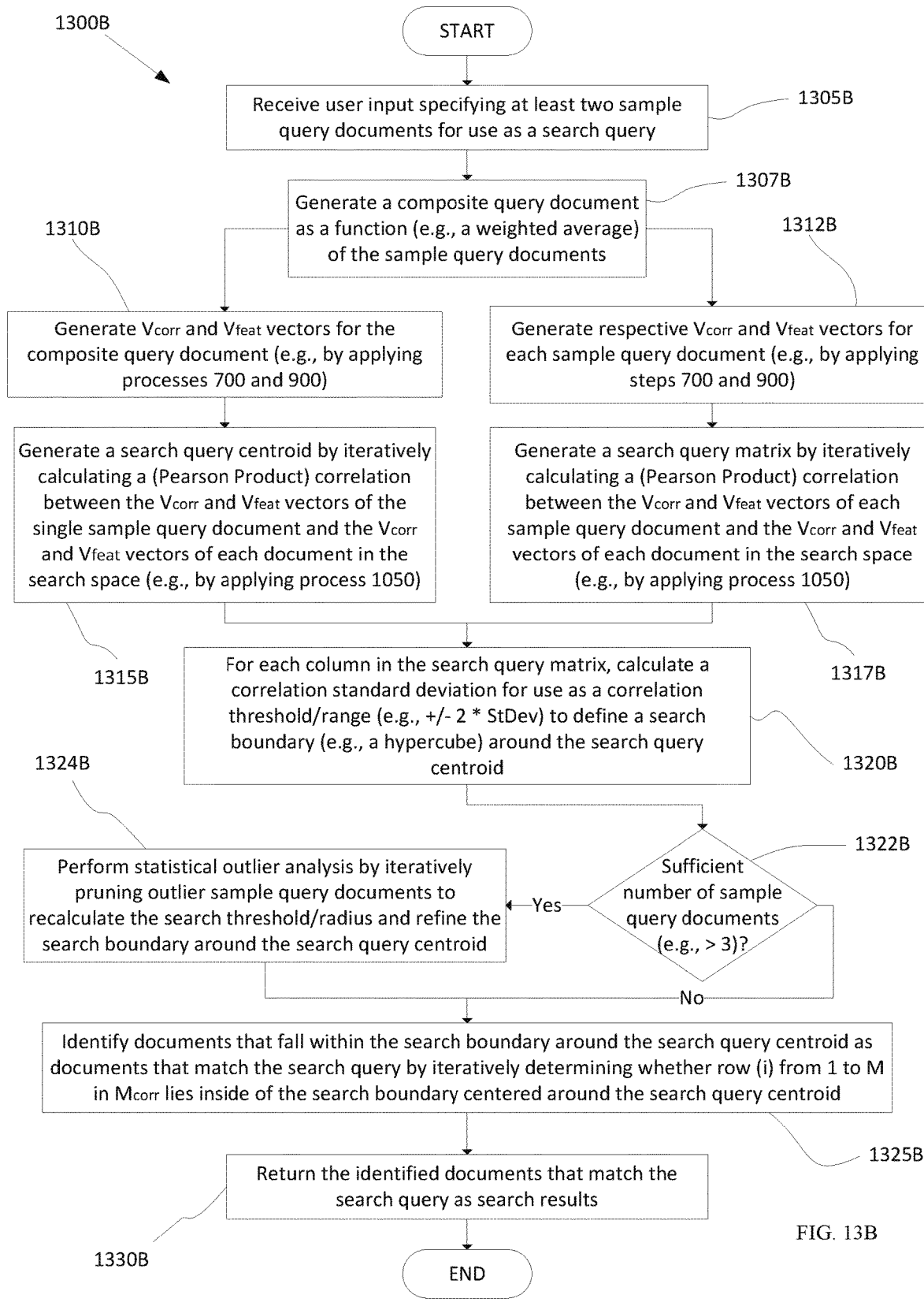
FIG. 13B depicts a flowchart illustrating an exemplary search process using multiple sample query documents as a search query.

FIG. 13B depicts a flowchart illustrating an exemplary search process using multiple sample query documents as a search query. The search process 1300B differs from the search process 1300A in that process 1300B may use multiple search query documents as inputs for a search query (as opposed to just a single document). In this sense, a user may feed the system many exemplar documents for a search query, which may then be combined into a "composite" search query document that is then used as the "centroid" of the search, with boundaries determined by the statistical deviation of the correlation values of the multiple search query documents.

The process 1300B starts similarly as the process 1300A, with a computer system receiving user input that specifies or selects at least two sample query documents ("exemplars" or "exemplary documents") for use as a search query (with Q number of sample query documents). Next, at step 1307B, the system generates a composite query document that is a function of the sample query documents. In various examples, the composite query document is a weighted average (e.g., in terms of pixel intensity) of all of the sample query documents. Next, at step 1310A, the system generates $V_{corr}$ and $V_{feat}$ vectors for the composite query document (e.g., by performing substantially the same process steps 700 and 900 depicted in FIGS. 7 and 9). Similarly, at step 1312B, the system generates respective $V_{corr}$ and $V_{feat}$ vectors for the each sample query document (e.g., by performing substantially the same process steps 700 and 900 depicted in FIGS. 7 and 9).

Next, at step 1315B, the system will generate a search query centroid (represented as a vector of length M) by iteratively calculating a (Pearson product) correlation between the $V_{corr}$ and $V_{feat}$ vectors associated with the composite query document, and the $V_{corr}$ and $V_{feat}$ vectors associated with each of the documents in the search space (the set documents being searched through). Step 1315B may include steps substantially similar to the process steps 1050 depicted in FIG. 10B (although step 1315A may only iterate through (j) and not (i) as explained in steps 1080). Similarly, at step 1317B, the system will generate a search query matrix (represented as a matrix of size Q X M) by iteratively calculating a (Pearson product) correlation between the $V_{corr}$ and $V_{feat}$ vectors of each sample query document, and the $V_{corr}$ and $V_{feat}$ vectors associated with each of the documents in the search space. Step 1315A may include steps substantially similar to the process steps 1050 depicted in FIG. 10B (although step 1317B may iterate (i) from 1 to Q, and (j) from 1 to M, as detailed in step 1080). Next, at step 1320, a variance and/or standard deviation value may be calculated for each column of the search query matrix. This vector of standard deviation values is then used as a correlation threshold/range for defining a multidimensional search boundary (represented as a hypercube in M dimensions) that is centered around the search query centroid. Next, at step 1322B, the system may determine whether a sufficient number of sample query documents has been provided to the system at step 1305B. The meaning of "sufficient number" may be a predetermined number (such as 3, 4, or 5 sample query documents) which may be coded into the computer system. In the case where a sufficient number of sample query documents is provided (the answer to step 1322B is "Yes"), then the system, at step 1324B, may iteratively prune off outlier sample query documents using standard outlier identification techniques (e.g., outside of 1.5* Interquartile Range (IQR)). Once outliers have been pruned, the system then iteratively recalculates the search threshold/range, as indicated by a new set of standard deviations that are calculated with the outliers excluded. Next, at step 1325B, the system identifies any documents in the search space that fall within the search boundary as search "hits," by determining which rows of the $M_{corr}$ matrix lie within the search boundary. This logical comparison is essentially determining which rows of $M_{corr}$ (each of which represents a vector of length M) fall inside of a hypercube defined by: (1) the search query centroid as the center of the hypercube, and (2) the set of standard deviations as the range of the hypercube. Put another way, the individual logical comparisons may determine whether an individual correlations values in $M_{corr}$ falls within a +/−range as defined by the search query centroid vector elements (center) and standard deviation vector elements (upper and lower bounds around the center). Lastly, at step 1330B, the system will assemble the list of search hits as a collection of search results, which may be displayed to a user in the GUI shown in FIG. 14.

In an illustrative example similar to the one above, say that the first row of $M_{corr}$ has the following values: $Z_{1,1}=1$, $Z_{1,2}=0.5$, $Z_{1,3}=0.7$, and $Z_{1,4}=-0.4$. In performing the process steps 1310B and 1315B, the system generates a vector value for the search query centroid of $SQC_1=1$, $SQC_2=0.51$, $SQC_3=0.68$, and $SQC_4=-0.405$. By performing the standard deviation calculation method of step 1320B, a vector of standard deviations is assembled, such as: $StDev_1=0.02$, $StDev_2=0.1$, $StDev_3=0.03$, and $StDev_4=0.1$. Therefore, using two times the StDev's, a search boundary/hypercube can be defined by: $C_1=1+/-0.04$, $C_2=0.5+/-0.2$, $C_3=0.7+/-0.06$, and $C_4=-0.4+/-0.2$. Given the above numbers, the first row of $M_{corr}$ would be a search hit, since that row falls within the range defined by the hypercube $C_1$-$C_4$. Therefore, the document associated with the first row of $M_{corr}$ would be a search hit that is returned as a search result in step 1330B. However, if the value of $StDev_4$ is instead equal to 0.001, then the first row of $M_{corr}$ would not be a search hit (since −0.405 lies outside of the range of −0.4+/−0.002).

To illustrate further, say for a given search query, a user picks three sample query documents. In such a case, the system may generate a composite document, generates the $V_{corr}$ and $V_{feat}$ vectors for that composite document, and then use those vectors (along with some intermediate processing steps) to search through the matrix $M_{corr}$ to find documents in the search space that "match" the three sample query documents. The composite document is an "average" of the three sample query documents. Using standard deviation calculation techniques, a multidimensional "blob" may be defined, with a centroid at its center. The system may iteratively trim off the outliers, using outlier analysis, to achieve a cohesive "blob." In some embodiments, three or more samples may be required to perform outlier analysis. The standard deviation profile may use two times the standard deviation as the range around the multidimensional centroid. In some examples, the range may be around 1.5-2 * standard deviations, although other values may be used. The composite document, as well as the individual sample query documents, may be used as inputs into a DNN to generate the correlation vectors (see, e.g., FIGS. 6 and 7). In performing the search logic, the matrix $M_{corr}$ may be sorted, so that the higher correlations end up on one side of the matrix. If there is only a single sample query document, the system may use predefined values (e.g., 99%, or 99.5%, for example) as a range about the search query centroid. If multiple sample query documents are used, the system may assume a normal distribution of the data (e.g., across the set of 3 sample query documents) when calculating a variance/standard deviation.

The composite document may be represented by the search query centroid, where all the extractions and DNN analysis depicted in FIGS. 6 and 8A-8B are performed. In this sense, the DNN and spectral feature extraction process may be applied both the samples being searched for, as well as the samples in the search space. In the case of three sample query documents, the system may generate four $V_{corr}$ and four $V_{feat}$ vectors—one $V_{corr}$ and $V_{feat}$ for the composite query document, and three $V_{corr}$ and $V_{feat}$ vectors for the individual sample query documents. Further analysis may consolidate down to two search criteria—one is the search query centroid, and the other is the standard deviations of all the features around that centroid. In some examples, a normal distribution with 99.5% correlation may be used to define a "volume" defined by a hypercube centered at the centroid. The search query centroid may represent a "new/virtual" document which can be correlated with the "entire universe" of the search space. Looking at each row of $M_{corr}$, associated with every document in the search space, there will be logic that compares the value on a given row, and see's whether it is inside the "volume" defined by the centroid. In this sense, the system may perform a K-means analysis for document searching. In some examples, the search space may be defined by the measure of values from [−1,+1] representing (Person product) correlation values. Although 2 * StDev may be used in some embodiments, other functions of the StDev may be used. By correlate the centroid with each document in the set of documents being searched through, the system may determine what documents "are not" (put another way, it may determine things that are not correlated with the centroid). For example, if you have a since search document that is the exact same as a document in the search space, the system may return an exact match. So if the system sorts the $M_{corr}$ matrix and finds an identical document, that identical document may be sorted up to the top of the sorted $M_{corr}$ matrix. The composite document and the standard deviations yields a "hypercube," which can then be compared against each row in $M_{corr}$ to determine whether the given row falls inside or outside of the hypercube.

Figure 14:
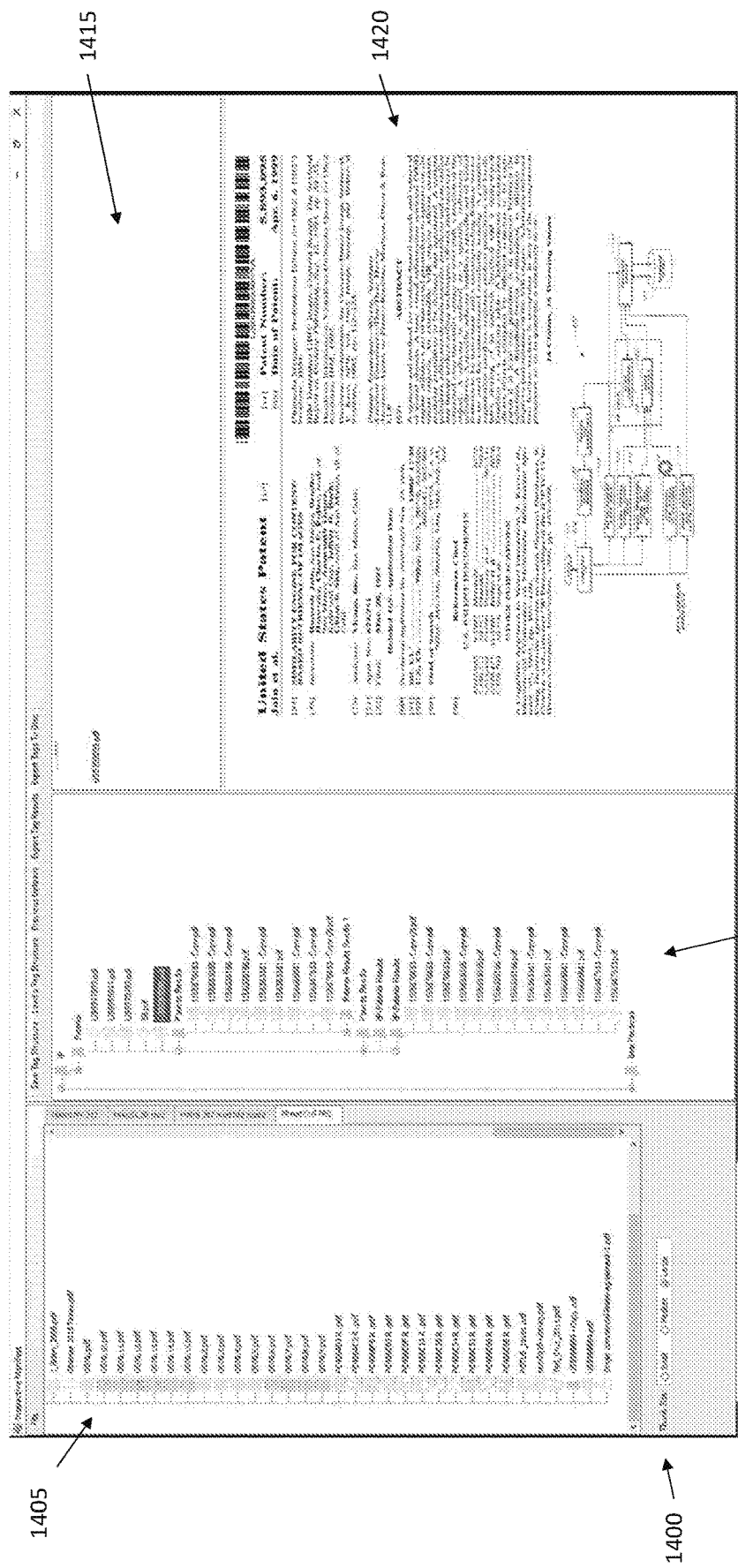
FIG. 14 depicts a plan view of an exemplary user interface for an electronic document classification system.

FIG. 14 depicts a plan view of an exemplary user interface for an electronic document classification system. A user interface 1400 includes an input data section 1405. The input data section 1405 may include a list view of the raw data (raw documents) used as inputs into various computer-implemented processes. The user interface 1400 includes a results section 1410. The results section 1410 may include a tree view that includes results from searching and/or clustering (e.g., the search results returned at step 1330 of FIG. 13). In various embodiments, when a user selects ("drags and drops") the raw documents from section 1405 into the section 1410, the system may automatically assign the relevant metadata to the raw documents to group the documents into classes. These classified documents are illustrated in FIG. 14, section 1010 as being branches that underly a class/group title. In this illustrative example, the class/group title is "Patents," under which all the search results that matched the search query for that specific search are listed. In this case, a patent document or collection of patent documents may have been used as "exemplars" in the initial search query. In various examples, the assigned metadata may include tags assigned to each document that specify in which class a given document has been classified. A user may then select a "export tag results" button, which may embed the tag (string) into the file properties of the documents, and may also place a copy of each document into a directory associated with a specific class (e.g., the directory in the exemplary illustration may be entitled "Class-Patents"). In another example, if there are 4 classes that have been identified using a classification algorithm (k-means), then there may be 4 different folders, each representing a different class/group. In various examples, the tags may be searchable by an end user. In this sense, assigning the relevant classification metadata to the original documents may beneficially allow the classes to "follow" the files, and for a user to be able to easily search and find files that fall into the same class.

The user interface 1400 also includes a view documents section 1415. The view documents section 1415 may provide a graphical user interface for accessing a file system that includes the documents. The user interface 1400 also includes a view single document section 1420. A view single documents section 1415 may display a view of a selected document (possibly selected using the view documents section 1415), so that a user may quickly (visually) verify that a given document is indeed similar to other documents falling in the same class.

Although various embodiments have been described with reference to the Figures, other embodiments are possible. For example, different embodiments may employ different types of machine learning algorithms. Various process steps may be optional, not required, skipped, or performed in a different order. Various embodiments may relate to a method of performing document recognition and classification without reading text. Some methods may include a pre-processing phase to normalize and standardize the document input. Some methods may include a pre-classification phase to generate a spectral signature. Some methods may include a classification phase to cluster documents with similar spectral features. Classification may be referred to as "spectral matching," in some examples. A pre-spectral transformed document may include "spatial" information (that indicates where things are), while a spectral transformation may include "frequency" information (that indicates what things are).

Some examples may relate to a method of extracting features from the spectral signature, which are used for recognition and classification. Various examples may relate to a method of using a neural network-based self-organizing mapping function to group similar spectral (appearance) features from different documents using a pattern-matching approach based on a standard set of high level spectra. Some embodiments may include a form of "adversarial" training to prepare the neural network. The neural network may, for example, allow for documents to be classified according to the presence or absence of features. Various embodiments may include a method for recursively pruning and re-grouping documents using neural networks to optimize classification accuracy. Various embodiments may include a method for transferring spectral feature result mapping to re-folder documents based on feature similarity. Various embodiments may include a method to find "more like this" using example document inputs. Various embodiments may include a method to persist tags on future data sets where documents and pages meet visual similarity thresholds.

Various aspects may reduce a document file for learning, classification, and/or searching, as the size of a given document may be on the order of megabits, which may be too much data to process in a reasonable time span. Accordingly, various embodiments may reduce the document into a set of numbers that may be used to make comparisons. Some examples may result in a vector of about 5, 10, 50, 100, 200, 500, or about 1000 numbers or more extracted from the spectrum for use in comparison. Various embodiments may compare this vector to the other vectors used by the DNN to classify and search documents. For example, the system may extract a histogram of numbers by adding up the values of pixels in each vertical column to make a row of summed numbers. This same calculation may also be done for the y-axis. The result may be a histogram with features ("bumps") in it (e.g., FIG. 4), which may then be analyzed to determine what features are predominant in the histogram(s). Some examples may run a DNN on the entire spectrally transformed document using a finite number of predetermined patterns. The DNN may generate multiple (floating point) numbers, where a large positive number may indicate more visual similarity, while a big negative number may indicate less visual similarity. After these numbers have been generated, the system may take all these numbers and put them into a single vector to get enough features to compare documents and get a sufficient correlation score. Some of these numbers may include a cross entropy parameter between two inputs. Various examples may utilize a cost function for a neuron.

Various embodiments may employ the following process steps: (1) a user takes a document in DOC or PDF format and the system converts it into a bitmap (e.g., an array of numbers representing pixels of the document); (2) the bitmap is then transformed into a symmetric representation (e.g., a square matrix or circle in polar coordinates) using transforms (generally using rescaling and/or interpolation of the bits), where the symmetric representation is also a bitmap (but possibly with interpolation, compressing different pixels, etc.); (3) a spectral transform (2D FFT) is performed along with applying Gaussian filters to smooth out the image (e.g., for maintaining appearance, "10 ft. test"); (4) the system extracts spectral features by, for example, taking the FFT square and dividing it into other squares, where analysis is performed in the following exemplary order: entire document, top left, top right, bottom left, bottom right. This order may be used because documents may empirically exhibit the most variance in bottom right, and highest similarity in top right/entire document level. This order may be adjusted, for example, depending on the document type. For example, the order may be different for documents in Hebrew.

Various embodiments may provide a quick and easy-to-use solution to the following problem scenario. A user (e.g., a customer or client) may have vast amount of data (perhaps on the order of gigabytes or terabytes or more) in the form of documents that aren't well described or organized. The user may have no idea or very little knowledge of what the data is. The user may be working in one of a variety of use cases (e.g., e-discovery, audits/investigations, M&A, etc.), there the user must review, organize, and sort through the vast library of documents. Documents requiring recognition and classification may span hundreds of types across a given enterprise and may include, for example, critical and restricted information such as contracts, agreements, intellectual property, design and performance data, drawings and documents containing personally identifiable information and protected health information. Such documents may pose security and governance risks to the organizations and loss can incur material harm. Documents may be organized by their type as a primary task in order to mitigate those risks. Documents may exist as a variety of file types (PDF, Microsoft Office, TIF, and other) and may exist in large volumes across a variety of storage locations. Imaged documents such as TIF and PDF may present special challenges due to the data losses incurred during text extraction, making the use of text-based tools ineffective and requiring significant manual intervention. Much of the restricted and critical information-containing documents may be of these TIF and PDF file types, therefore potentially creating a high degree of location and containment risk.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments may be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from a source to a receiver over a dedicated physical link (e.g., fiber optic link, infrared link, ultrasonic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, FireWire, ATA/IDE, RS-232, RS-422, RS-485, 802.11 a/b/g/n, Wi-Fi, WiFi-Direct, Li-Fi, BlueTooth, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In various embodiments, a computer system may include non-transitory memory. The memory may be connected to the one or more processors may be configured for encoding data and computer readable instructions, including processor executable program instructions. The data and computer readable instructions may be accessible to the one or more processors. The processor executable program instructions, when executed by the one or more processors, may cause the one or more processors to perform various operations.

A number of implementations have been described. Nevertheless, it will be understood that various modification may be made. For example, advantageous results may be achieved if the steps of the disclosed techniques were performed in a different sequence, or if components of the disclosed systems were combined in a different mDNNer, or if the components were supplemented with other components. Accordingly, other implementations are within the scope of the following claims.

What is claimed is:

1. A computer-implemented method for matching visual spectra of document page appearance, comprising:
   providing a pre-trained deep neural network (DNN) that has been pre-trained using a set of spectral patterns ($SP_n$) associated with a set of predetermined patterns ($P_n$);
   providing a set of documents ($D_m$);
   transforming each document ($D_i$) in the set of documents ($D_m$) into its associated document spectral signature ($S_i$) using a two-dimensional Fourier transform;
   processing each document spectral signature ($S_i$) through the pre-trained DNN;
   for each document spectral signature ($S_i$):
      generating a correlation vector ($V_{corr}$) of size n as a result of processing the document spectral signature ($S_i$) through the trained DNN; and,
      generating a spectral feature vector ($V_{feat}$) by extracting at least one spectral feature from the document spectral signature ($S_i$);
   assembling each correlation vector ($V_{corr}$) associated with each document ($D_i$) to generate a set of correlation vectors ($\{V_{corr,1}, V_{corr,2}, \ldots V_{corr,m}\}$);
   assembling each spectral feature vector ($V_{feat}$) associated with each document ($D_i$) to generate a set of spectral feature vectors ($\{V_{feat,1}, V_{feat,2}, V_{feat,m}\}$);
   generating a cross-correlation matrix ($M_{corr}$) of size (m * m) using at least one of the set of correlation vectors ($\{V_{corr,1}, V_{corr,2}, \ldots V_{corr,m}\}$) and the set of spectral feature vectors ($\{V_{feat,1}, V_{feat,2}, \ldots V_{feat,m}\}$);
   providing at least one search query document ($D_s$) for use as a search query;
   generating a search query centroid and a search threshold range centered around the search query centroid as a function of the at least one search query document ($D_s$);
   searching for matching documents in the set of documents ($D_m$) that are similar to the at least one sample document ($D_s$) by determining which entries of the correlation matrix ($M_{corr}$) fall within a search boundary defined by the search query centroid and the search threshold range; and,
   returning a set of matched documents ($MD_1$) based on the search.

2. The computer-implemented method of claim 1, wherein DNN comprises an adversarial deep neural network (DNN) that implements a softmax function in at least one layer of the DNN.

3. The computer-implemented method of claim 1, further comprising an intermediate step of converting each document ($D_i$) in the set of documents ($D_m$) to the document's symmetric image representation when transforming the image representation of each document ($D_i$) in the set of documents ($D_m$) into its associated document spectral signature ($S_i$).

4. The computer-implemented method of claim 1, further comprising an intermediate step of performing at least one of a Gaussian transformation, an affine transformation, and a Gabor transformation to each document spectral signature ($S_i$) before processing each document spectral signature ($S_i$) through the pre-trained DNN.

5. The computer-implemented method of claim 1, wherein at least one predetermined pattern ($P_j$) in the set of predetermined patterns ($P_n$) is selected from the group consisting of a rectangular pattern, a crosshatch pattern, and a periodic curve pattern.

6. The computer-implemented method of claim 1, further comprising training a DNN using the set of spectral patterns ($SP_n$) associated with the set of predetermined patterns ($P_n$) to generate the pre-trained DNN.

7. The computer-implemented method of claim 6, further comprising an intermediate step of performing at least one of a Gaussian transformation, an affine transformation, and a Gabor transformation to each spectral pattern ($SP_k$) in the set of spectral patterns ($SP_n$) before training the DNN using the set of spectral patterns ($SP_n$).

8. The computer-implemented method of claim 1, wherein the step of generating a spectral feature vector ($V_{feat}$) comprises summing up intensity values of pixels in the document spectral signature ($S_i$) along at least one of an x-axis and a y-axis of the document spectral signature ($S_i$).

9. The computer-implemented method of claim 1, wherein the step of generating a cross-correlation matrix ($M_{corr}$) comprises determining Pearson-product correlation values between vectors in at least one of the set of correlation vectors ($\{V_{corr,1}, V_{corr,2}, \ldots V_{corr,m}\}$) and the set of spectral feature vectors ($\{V_{feat,1}, V_{feat,2}, \ldots V_{feat,m}\}$).

10. The computer-implemented method of claim 1, further comprising displaying a representation of the set of matched documents ($MD_1$) in a graphical user interface (GUI).

11. A computer program product (CPP) tangibly embodied in a non-transitory computer readable medium and storing instructions that, when executed by a processor, cause the processor to perform operations to match visual spectra of document page appearance, the operations comprising:
providing a pre-trained deep neural network (DNN) that has been pre-trained using a set of spectral patterns ($SP_n$) associated with a set of predetermined patterns ($P_n$);
providing a set of documents ($D_m$);
transforming each document ($D_i$) in the set of documents ($D_m$) into its associated document spectral signature ($S_i$) using a two-dimensional Fourier transform;
processing each document spectral signature ($S_i$) through the pre-trained DNN;
for each document spectral signature ($S_i$):
generating a correlation vector ($V_{corr}$) of size n as a result of processing the document spectral signature ($S_i$) through the trained DNN; and,
generating a spectral feature vector ($V_{feat}$) by extracting at least one spectral feature from the document spectral signature ($S_i$);
assembling each correlation vector ($V_{corr}$) associated with each document ($D_i$) to generate a set of correlation vectors ($\{V_{corr,1}, V_{corr,2}, \ldots V_{corr,m}\}$);
assembling each spectral feature vector ($V_{feat}$) associated with each document ($D_i$) to generate a set of spectral feature vectors ($\{V_{feat,1}, V_{feat,2}, \ldots V_{feat,m}\}$);
generating a cross-correlation matrix ($M_{corr}$) of size (m * m) using at least one of the set of correlation vectors ($\{V_{corr,1}, V_{corr,2}, \ldots V_{corr,m}\}$) and the set of spectral feature vectors ($\{V_{feat,1}, V_{feat,2}, \ldots V_{feat,m}\}$);
providing at least one search query document ($D_s$) for use as a search query;
generating a search query centroid and a search threshold range centered around the search query centroid as a function of the at least one search query document ($D_s$);
searching for matching documents in the set of documents ($D_m$) that are similar to the at least one sample document ($D_s$) by determining which entries of the correlation matrix ($M_{corr}$) fall within a search boundary defined by the search query centroid and the search threshold range; and,
returning a set of matched documents ($MD_1$) based on the search.

12. The CPP of claim 11, further comprising an intermediate step of performing at least one of a Gaussian transformation, an affine transformation, and a Gabor transformation to each document spectral signature ($S_i$) before processing each document spectral signature ($S_i$) through the pre-trained DNN.

13. The CPP of claim 11, wherein at least one predetermined pattern ($P_j$) in the set of predetermined patterns ($P_n$) is selected from the group consisting of a rectangular pattern, a crosshatch pattern, and a periodic curve pattern.

14. The CPP of claim 11, wherein the step of generating a spectral feature vector ($V_{feat}$) comprises summing up intensity values of pixels in the document spectral signature ($S_i$) along at least one of an x-axis and a y-axis of the document spectral signature ($S_i$).

15. The CPP of claim 11, wherein the step of generating a cross-correlation matrix ($M_{corr}$) comprises determining Pearson-product correlation values between vectors in at least one of the set of correlation vectors ($\{V_{corr,1}, V_{corr,2}, \ldots V_{corr,m}\}$) and the set of spectral feature vectors ($\{V_{feat,1}, V_{feat,2}, \ldots V_{feat,m}\}$).

16. The computer system of claim 15, wherein the operations further comprise an intermediate step of performing at least one of a Gaussian transformation, an affine transformation, and a Gabor transformation to each document spectral signature ($S_i$) before processing each document spectral signature ($S_i$) through the pre-trained DNN.

17. The computer system of claim 15, wherein at least one predetermined pattern ($P_j$) in the set of predetermined patterns ($P_n$) is selected from the group consisting of a rectangular pattern, a crosshatch pattern, and a periodic curve pattern.

18. The computer system of claim 15, wherein the operation of generating a spectral feature vector ($V_{feat}$) comprises summing up intensity values of pixels in the document spectral signature ($S_i$) along at least one of an x-axis and a y-axis of the document spectral signature ($S_i$).

19. The computer system of claim 15, wherein the step of generating a cross-correlation matrix ($M_{corr}$) comprises determining Pearson-product correlation values between vectors in at least one of the set of correlation vectors ($\{V_{corr,1}, V_{corr,2}, \ldots V_{corr,m}\}$) and the set of spectral feature vectors ($\{V_{feat,1}, V_{feat,2}, \ldots V_{feat,m}\}$).

20. A computer system for matching visual spectra of document page appearance, the computer system comprising:
a processor; and,
a non-transitory computer readable medium storing instructions that, when executed by the processor, cause the processor to perform operations to match visual spectra of document page appearance, the operations comprising:

providing a pre-trained deep neural network (DNN) that has been pre-trained using a set of spectral patterns ($SP_n$) associated with a set of predetermined patterns ($P_n$);

providing a set of documents ($D_m$);

transforming each document ($D_i$) in the set of documents ($D_m$) into its associated document spectral signature ($S_i$) using a two-dimensional Fourier transform;

processing each document spectral signature ($S_i$) through the pre-trained DNN;

for each document spectral signature ($S_i$):

generating a correlation vector ($V_{corr}$) of size n as a result of processing the document spectral signature ($S_i$) through the trained DNN; and, generating a spectral feature vector ($V_{feat}$) by extracting at least one spectral feature from the document spectral signature ($S_i$);

assembling each correlation vector ($V_{corr}$) associated with each document ($D_i$) to generate a set of correlation vectors ($\{V_{corr,1}, V_{corr,2}, \ldots V_{corr,m}\}$);

assembling each spectral feature vector ($V_{feat}$) associated with each document ($D_i$) to generate a set of spectral feature vectors ($\{V_{feat,1}, V_{feat,2}, \ldots V_{feat,m}\}$);

generating a cross-correlation matrix ($M_{corr}$) of size (m * m) using at least one of the set of correlation vectors ($\{V_{corr,1}, V_{corr,2}, \ldots V_{corr,m}\}$) and the set of spectral feature vectors ($\{V_{feat,1}, V_{feat,2}, \ldots V_{feat,m}\}$);

providing at least one search query document ($D_s$) for use as a search query;

generating a search query centroid and a search threshold range centered around the search query centroid as a function of the at least one search query document ($D_s$);

searching for matching documents in the set of documents ($D_m$) that are similar to the at least one sample document ($D_s$) by determining which entries of the correlation matrix ($M_{corr}$) fall within a search boundary defined by the search query centroid and the search threshold range; and, returning a set of matched documents ($MD_1$) based on the search.

* * * * *